United States Patent
Koh et al.

(10) Patent No.: US 7,854,855 B2
(45) Date of Patent: Dec. 21, 2010

(54) ELECTROLYTIC SOLUTION

(75) Inventors: Meiten Koh, Settsu (JP); Akiyoshi Yamauchi, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 586 days.

(21) Appl. No.: 11/887,543

(22) PCT Filed: Mar. 28, 2006

(86) PCT No.: PCT/JP2006/306247

§ 371 (c)(1),
(2), (4) Date: Oct. 1, 2007

(87) PCT Pub. No.: WO2006/106655

PCT Pub. Date: Oct. 12, 2006

(65) Prior Publication Data

US 2009/0086408 A1    Apr. 2, 2009

(30) Foreign Application Priority Data

Mar. 31, 2005   (JP)   ............................. 2005-102899
Jul. 6, 2005    (JP)   ............................. 2005-198074

(51) Int. Cl.
*H01M 14/00* (2006.01)

(52) U.S. Cl. .................. 252/62.2; 429/338; 361/503; 361/502

(58) Field of Classification Search ............. 429/338; 252/62.2; 361/503, 502
See application file for complete search history.

(56) References Cited

U.S. PATENT DOCUMENTS 5,750,730 A * 5/1998 Nakano et al. .............. 549/229
5,916,708 A   6/1999 Besenhard et al.
2006/0127777 A1 * 6/2006 Ihara et al. ................. 429/326
2010/0062344 A1 * 3/2010 Koh et al. ................... 429/330

FOREIGN PATENT DOCUMENTS

| JP | 10-247519     | * | 9/1998 |
| JP | 2003-86245 A  |   | 3/2003 |
| JP | 2003-217656 A |   | 7/2003 |
| JP | 2004-207140   | * | 7/2004 |
| JP | 2004-207140 A |   | 7/2004 |

OTHER PUBLICATIONS

Translation for JP 2004-207-140.*

* cited by examiner

*Primary Examiner*—C. Melissa Koslow
(74) *Attorney, Agent, or Firm*—Sughrue Mion, PLLC

(57) ABSTRACT

There is provided an electrolytic solution comprising a fluorine-containing cyclic carbonate (I) represented by the formula (I):

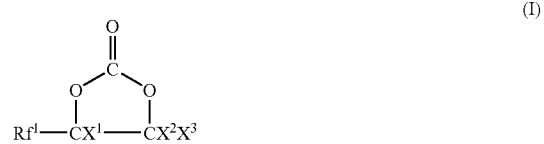

wherein $Rf^1$ is a fluorine-containing ether group (Ia), a fluorine-containing alkoxyl group (Ib) or a fluorine-containing alkyl group (Ic) having two or more carbon atoms; $X^1$ and $X^2$ are the same or different and each is H, F, Cl, $CF_3$ or $CH_3$; $X^3$ is H, F, Cl or an alkyl group in which hydrogen atom may be substituted with halogen atom and hetero atom may be contained in its chain, and an electrolyte salt (II). The electrolytic solution is excellent in flame retardance, low temperature characteristics and withstand voltage, high in solubility of an electrolyte salt and excellent in compatibility with a hydrocarbon solvent.

7 Claims, No Drawings

ELECTROLYTIC SOLUTION

TECHNICAL FIELD

The present invention relates to an electrolytic solution comprising a cyclic carbonate having a fluorine-containing ether group or a fluorine-containing alkyl group and an electrolyte salt.

BACKGROUND ART

Carbonates such as ethylene carbonate, propylene carbonate and dimethyl carbonate are used as a solvent for an electrolyte salt of lithium secondary battery, solar cell, radical battery and capacitor. However since a flash point is low and combustibility is high, there is a danger of firing and explosion attributable to over-charging and over-heating, and in addition, since viscosity is high and conductivity at low temperatures is low, there is a problem that an output is decreased.

In addition, in the case of lithium secondary batteries, improvement in a withstand voltage of an electrolytic solution is demanded for increasing a capacity. Further in the case of capacitors, it is desirable that both of a negative electrode and a positive electrode are made of hard carbon, particularly it is desirable that a capacitor can be used stably at a voltage of not less than 3 V. In the case of solvents for electrolyte salts such as propylene carbonate and dimethyl carbonate which have been so far used, decomposition of an electrolytic solution occurs at a voltage of not less than 3 V, and therefore such solvents cannot be used.

To solve the mentioned problem, methods of adding a fluorine-containing ether have been proposed (JP6-176768A, JP8-37024A, JP11-307123A, JP2000-294281A, etc.).

However fluorine-containing ethers have lower viscosity at low temperatures as compared with carbonates having a fluorine-containing alkyl group at an end thereof, but there are disadvantages that solubility of a lithium salt which is an electrolyte salt is low, and since compatibility with hydrocarbon carbonates which are used as a solvent for dissolving an electrolyte salt is low, separation into two phases occurs. In addition, since a flash point is relatively low, improvement in flame retardance is necessary. Those are important problems to be solved.

In addition, use of a fluorine-containing chain carbonate which is obtained by fluorinating a chain carbonate is proposed (JP6-219992A, JP10-149840A, JP2001-256983A, JP2000-327634A, etc.).

However the carbonates in which an end of a fluorine-containing alkyl group is perfluoro (JP10-149840A and JP2001-256983A) have disadvantages that solubility of an electrolyte salt is low and compatibility with a hydrocarbon solvent is poor. In the case of carbonates having a hydrocarbon alkyl group at one end (JP6-219992A and JP2000-327634A), solubility of an electrolyte salt and compatibility with a hydrocarbon solvent are improved, but there are lowering of flame retardance and decrease in a withstand voltage due to a decreased fluorine content.

It has been proposed to use a fluorine-containing cyclic carbonate as an electrolytic solution. For example, there are proposals to use compounds obtained by replacing a part of hydrogen atoms of ethylene carbonate with fluorine atoms (JP5-325985A, JP10-189043A, JP2001-313075A, JP2003-168480A, etc.) and proposals to use compounds obtained by replacing a part or the whole of hydrogen atoms of methyl groups of propylene carbonate with fluorine atoms (JP8-37025A, JP10-233345A, etc.).

However with respect to the compounds obtained by replacing a part of hydrogen atoms of ethylene carbonate with fluorine atoms, synthesis and separation are difficult and flame retardance is not enough. Also with respect to the compounds obtained by replacing a part or the whole of hydrogen atoms of methyl groups of propylene carbonate with fluorine atoms, there are lowering of solubility of an electrolyte salt, lowering of a discharging efficiency and increase in viscosity, and thus the compounds do not always satisfy required performances. Further it is desirable that electrolytic solutions for lithium secondary batteries and capacitors are liquids at a temperature of not less than −20° C. However a trifluoromethyl cyclic carbonate is a solid at −20° C. and therefore there is a limit in use thereof for these applications.

In the case of electrolytic solutions for capacitors and radical batteries which repeat charging and discharging like lithium secondary batteries, improvement in flame retardance and a withstand voltage and enhancement of low temperature characteristics in which viscosity is not increased even at low temperatures and yet decrease in conductivity is small are desired.

DISCLOSURE OF INVENTION

The present invention aims at solving the above-mentioned problems involved in conventional technologies, and it is an object of the present invention to provide an electrolytic solution having excellent low temperature characteristics, an adequate withstand voltage, enhanced flame retardance, high solubility of an electrolyte salt, and excellent compatibility with a hydrocarbon solvent.

The present inventors have made intensive studies with respect to compounds satisfying required characteristics of an electrolytic solution for a non-aqueous electrolyte on the basis of fluorine-containing cyclic carbonates, and as a result, have found that the above-mentioned problems can be solved by introducing a fluorine-containing ether group or a fluorine-containing alkyl group having two or more carbon atoms to one end of a cyclic carbonate, and have completed the present invention.

Namely, the present invention relates to an electrolytic solution comprising a cyclic carbonate (I) represented by the formula (I):

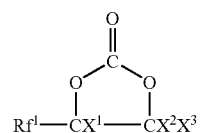

wherein $Rf^1$ is a fluorine-containing ether group (Ia), a fluorine-containing alkoxyl group (Ib) or a fluorine-containing alkyl group (Ic) having two or more carbon atoms; $X^1$ and $X^2$ are the same or different and each is H, F, Cl, $CF_3$ or $CH_3$; $X^3$ is H, F, Cl or an alkyl group in which hydrogen atom may be substituted with halogen atom and hetero atom may be contained in its chain, and an electrolyte salt (II).

BEST MODE FOR CARRYING OUT THE INVENTION

The electrolytic solution of the present invention comprises the specific cyclic carbonate (I) which is a solvent for dissolving an electrolyte salt and has a fluorine-containing ether group or a fluorine-containing alkyl group on one end thereof, and the electrolyte salt (II).

The specific fluorine-containing cyclic carbonate (I) used in the present invention is represented by the formula (I):

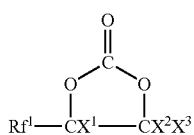

wherein $Rf^1$ is a fluorine-containing ether group (Ia), a fluorine-containing alkoxyl group (Ib) or a fluorine-containing alkyl group (Ic) having two or more carbon atoms; $X^1$ and $X^2$ are the same or different and each is H, F, Cl, $CF_3$ or $CH_3$; $X^3$ is H, F, Cl or an alkyl group in which hydrogen atom may be substituted with halogen atom and hetero atom may be contained in its chain.

Since the fluorine-containing cyclic carbonate of the present invention has a fluorine-containing ether structure or a fluorine-containing alkyl group having two or more carbon atoms, further decrease in viscosity at low temperatures, increase in a flash point and in addition, enhancement of solubility of an electrolyte salt can be expected.

$Rf^1$ is a fluorine-containing ether group (Ia), preferably a fluorine-containing ether group having 2 to 17 carbon atoms, a fluorine-containing alkoxyl group (Ib), preferably a fluorine-containing alkoxyl group having 1 to 17 carbon atoms, or a fluorine-containing alkyl group (Ic) having two or more carbon atoms, preferably a fluorine-containing alkyl group having 2 to 17 carbon atoms.

The fluorine content of $Rf^1$ is preferably not less than 10% by mass. When the fluorine content is small, an effect of increasing viscosity at low temperatures and an effect of increasing a flash point cannot be sufficiently obtained. From this point of view, the fluorine content of $Rf^1$ is preferably not less than 20% by mass, more preferably not less than 30% by mass. An upper limit is usually 76% by mass. The fluorine content of $Rf^1$ is calculated from the composition of component atoms.

In addition, the fluorine content of the whole fluorine-containing cyclic carbonate (I) is not less than 10% by mass, preferably not less than 20% by mass, and an upper limit is usually 76% by mass. The fluorine content of the whole fluorine-containing cyclic carbonate (I) is measured by a combustion method explained infra.

The number of carbon atoms of the fluorine-containing ether group (Ia) is preferably 2 to 17. When the number of carbon atoms exceeds 17, the viscosity of the cyclic carbonate (I) is increased and since the number of fluorine-containing groups is increased, in some cases, there are lowering of solubility of the electrolyte salt and lowering of compatibility with other solvents due to decrease in a dielectric constant. From this point of view, the number of carbon atoms of $Rf^1$ is preferably 2 to 10, more preferably 2 to 7.

The alkylene group constituting the ether portion of the fluorine-containing ether group (Ia) may be a linear or branched alkylene group. Examples of a minimum structural unit constituting such a linear or branched alkylene group are as follows.

(i) Minimum structural unit of linear type

—$CH_2$—, —CHF—, —$CF_2$—, —CHCl—, —CFCl—, —$CCl_2$—

(ii) Minimum structural unit of branched type

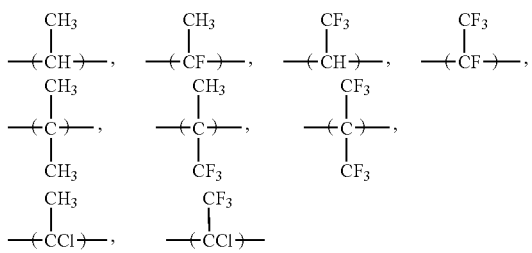

The alkylene group has any one of these minimum structural units alone or a combination of linear types (i) or branch types (ii) or an optional combination thereof. Preferable examples are explained infra.

It is preferable that the alkylene group has a structural unit having no Cl among the above-mentioned examples, because a de-HCl reaction by a base does not occur and thus the structural unit is stable.

Further preferable fluorine-containing ether group (Ia) is a fluorine-containing ether group represented by the formula (Ia-1):

$$R^1\text{—}(OR^2)_{n1}\text{—} \qquad \text{(Ia-1)}$$

wherein $R^1$ is an alkyl group which may have fluorine atom, preferably an alkyl group having 1 to 6 carbon atoms; $R^2$ is an alkylene group which may have fluorine atom, preferably an alkylene group having 1 to 4 carbon atoms; n1 is an integer of 1 to 3.

More specifically there are exemplified the following combinations, but the ether group is not limited to them.

(a) $R^1$ is further preferably an alkyl group represented by the formula (1): $X^4X^5X^6C\text{—}(R^4)_{n2}\text{—}$, where $X^4$, $X^5$ and $X^6$ are the same or different and each is H or F; $R^4$ is an alkylene group having 1 to 5 carbon atoms which may have fluorine atom; n2 is 0 or 1.

When n2 is 0, $R^1$ is $CH_3$—, $CF_3$—, $HCF_2$— or $H_2CF$—.

When n2 is 1, examples of the linear $R^1$ are $CF_3CH_2$—, $CF_3CF_2$—, $CF_3CH_2CH_2$—, $CF_3CF_2CH_2$—, $CF_3CF_2CF_2$—, $CF_3CH_2CF_2$—, $CF_3CH_2CH_2CH_2$—, $CF_3CF_2CH_2CH_2$—, $CF_3CH_2CF_2CH_2$—, $CF_3CF_2CF_2CH_2$—, $CF_3CF_2CF_2CF_2$—, $CF_3CF_2CH_2CF_2$—, $CF_3CH_2CH_2CH_2CH_2$—, $CF_3CF_2CH_2CH_2CH_2$—, $CF_3CH_2CF_2CH_2CH_2$—, $CF_3CF_2CF_2CH_2CH_2$—, $CF_3CF_2CH_2CF_2CH_2$—, $CF_3CF_2CH_2CH_2CH_2CH_2$—, $CF_3CF_2CF_2CF_2CH_2CH_2$—, $CF_3CF_2CH_2CF_2CH_2CH_2$—, $HCF_2CH_2$—, $HCF_2CF_2$—, $HCF_2CH_2CH_2$—, $HCF_2CF_2CH_2$—, $HCF_2CH_2CF_2$—, $HCF_2CF_2CH_2CH_2$—, $HCF_2CH_2CF_2CH_2$—, $HCF_2CF_2CF_2CF_2$—, $HCF_2CF_2CH_2CH_2CH_2$—, $HCF_2CH_2CF_2CH_2CH_2$—, $HCF_2CF_2CF_2CF_2CH_2$—, $HCF_2CF_2CF_2CF_2CH_2CH_2$—, $FCH_2CH_2$—, $FCH_2CF_2$—, $FCH_2CF_2CH_2$—, $CH_3CF_2$—, $CH_3CH_2$—, $CH_3CF_2CH_2$—, $CH_3CF_2CF_2$—, $CH_3CH_2CH_2$—, $CH_3CF_2CH_2CF_2$—, $CH_3CF_2CF_2CF_2$—, $CH_3CH_2CF_2CF_2$—, $CH_3CH_2CH_2CH_2$—, $CH_3CF_2CH_2CF_2CH_2$—, $CH_3CF_2CF_2CF_2CH_2$—, $CH_3CF_2CF_2CH_2CH_2$—, $CH_3CH_2CF_2CF_2CH_2$—, $CH_3CF_2CH_2CF_2CH_2$—, $CH_3CF_2CH_2CH_2CH_2$—, $CH_3CH_2CF_2CH_2CH_2CH_2$—, and the like, and examples of the branched $R^1$ are

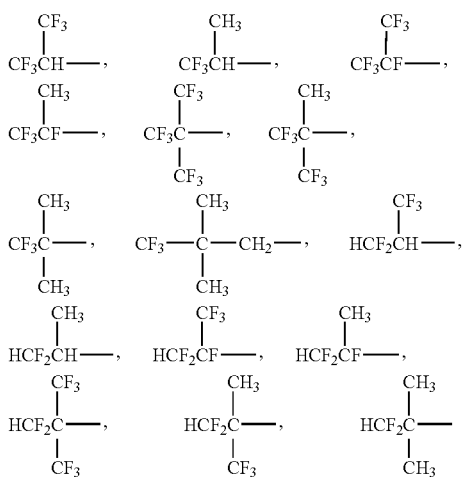

and the like.

However when having a branch such as —$CH_3$ or —$CF_3$, since viscosity is easily increased, a linear type is more preferred.

(b) $R^2$ of —$(OR^2)_{n1}$— n1 is an integer of 1 to 3, preferably 1 or 2. When n1 is 2 or 3, $R^2$ may be the same or different.

Preferred examples of $R^2$ are the following linear types or branched types.

Examples of linear type are —$CH_2$—, —CHF—, —$CF_2$—, —$CH_2CH_2$—, —$CF_2CH_2$—, —$CF_2CF_2$—, —$CH_2CF_2$—, —$CH_2CH_2CH_2$—, —$CH_2CH_2CF_2$—, —$CH_2CF_2CH_2$—, —$CH_2CF_2CF_2$—, —$CF_2CH_2CH_2$—, —$CF_2CF_2CH_2$—, —$CF_2CH_2CF_2$—, —$CF_2CF_2CF_2$—, and the like, and examples of branched type are:

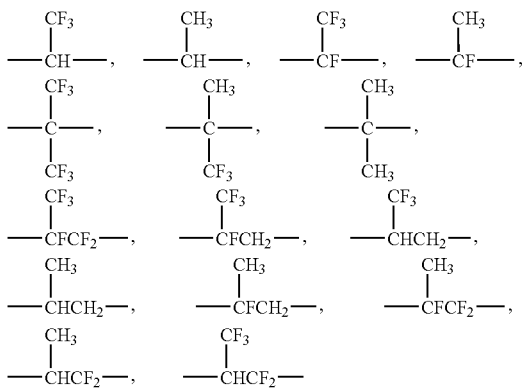

and the like.

$Rf^1$ may be the fluorine-containing alkoxyl group (Ib) having 1 to 17 carbon atoms, preferably 1 to 6 carbon atoms.

Specifically further preferable fluorine-containing alkoxyl groups are those represented by the formula (2): $X^7X^8X^9C$—$(R^5)_{n4}$—O—, where $X^7$, $X^8$ and $X^9$ are the same or different and each is H or F; $R^5$ is preferably an alkylene group having 1 to 5 carbon atoms which may have fluorine atom; n4 is 0 or 1; either of $X^7$, $X^8$, $X^9$ or $R^5$ contains fluorine atom.

Examples of the fluorine-containing alkoxyl group (Ib) are the same as those exemplified in the explanation of $R^1$ represented by the above-mentioned formula (1).

Further $Rf^1$ may be the fluorine-containing alkyl group (Ic) having two or more carbon atoms. The number of carbon atoms of the fluorine-containing alkyl group is preferably 2 to 17, more preferably 2 to 7, especially 2 to 5. When the number of carbon atoms is too large, characteristics at low temperatures are lowered and solubility of the electrolyte salt is lowered, and when the number of carbon atoms is 1, as mentioned above, there are recognized lowering of solubility of the electrolyte salt, lowering of a discharging efficiency and increase in viscosity.

Specifically there are preferably exemplified fluorine-containing alkyl groups represented by the formula (Ic-1):

$$R^{20}\text{-}R^{21}\text{—} \qquad (Ic\text{-}1)$$

wherein $R^{20}$ is an alkyl group having one or more carbon atoms which may have fluorine atom; $R^{21}$ is an alkylene group having 1 to 3 carbon atoms; at least either of $R^{20}$ or $R^{21}$ contains fluorine atom, from the viewpoint of satisfactory solubility of the electrolyte salt.

$R^{20}$ is an alkyl group having one or more carbon atoms which may have fluorine atom, preferably a linear or branched alkyl group having 1 to 16 carbon atoms, further 1 to 6 carbon atoms, especially 1 to 3 carbon atoms.

Specifically preferable examples of $R^{20}$ are non-fluorine-containing alkyl groups such as $CH_3$—, $CH_3CH_2$—, $CH_3CH_2CH_2$—, $CH_3CH_2CH_2CH_2$—,

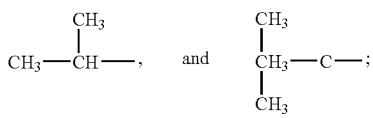

fluorine-containing linear alkyl groups such as $CF_3$—, $CF_3CH_2$—, $CF_3CF_2$—, $CF_3CH_2CH_2$—, $CF_3CF_2CH_2$—, $CF_3CF_2CF_2$—, $CF_3CH_2CF_2$—, $CF_3CH_2CH_2CH_2$—, $CF_3CF_2CH_2CH_2$—, $CF_3CH_2CF_2CH_2$—, $CF_3CF_2CF_2CH_2$—, $CF_3CF_2CH_2CF_2$—, $CF_3CH_2CH_2CH_2CH_2$—, $CF_3CF_2CH_2CH_2CH_2$—, $CF_3CH_2CF_2CH_2CH_2$—, $CF_3CF_2CF_2CH_2CH_2$—, $CF_3CF_2CF_2CF_2CH_2$—, $CF_3CF_2CH_2CF_2CH_2$—, $CF_3CF_2CH_2CH_2CH_2CH_2$—, $CF_3CF_2CF_2CH_2CH_2$—, $CF_3CF_2CH_2CF_2CH_2CH_2$—, $HCF_2$—, $HCF_2CH_2$—, $HCF_2CF_2$—, $HCF_2CH_2CH_2$—, $HCF_2CF_2CH_2$—, $HCF_2CH_2CF_2$—, $HCF_2CF_2CH_2CH_2$—, $HCF_2CH_2CF_2CH_2$—, $HCF_2CF_2CF_2CF_2$—, $HCF_2CF_2CH_2CH_2CH_2$—, $HCF_2CH_2CF_2CH_2CH_2$—, $HCF_2CF_2CF_2CF_2CH_2$—, $HCF_2CF_2CF_2CF_2CH_2CH_2$—, $FCH_2$—, $FCH_2CH_2$—, $FCH_2CF_2$—, $FCH_2CF_2CH_2$—, $FCH_2CF_2CF_2$—, $CH_3CF_2CH_2$—, $CH_3CF_2CF_2$—, $CH_3CH_2CH_2$—, $CH_3CF_2CH_2CF_2$—, $CH_3CF_2CF_2CF_2$—, $CH_3CH_2CF_2CF_2$—, $CH_3CF_2CH_2CF_2CH_2$—, $CH_3CF_2CF_2CF_2CH_2$—, $CH_3CF_2CF_2CH_2CH_2$—, $CH_3CH_2CF_2CF_2CH_2$—, $CH_3CF_2CH_2CF_2CH_2$—, $CH_3CF_2CH_2CF_2CH_2CH_2$—, $HCFClCF_2CH_2$—, $HCF_2CFClCH_2$, $HCF_2CFClCF_2CFClCH_2$— and $HCFClCF_2CFClCF_2CH_2$—, and fluorine-containing branched alkyl groups such as

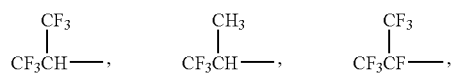

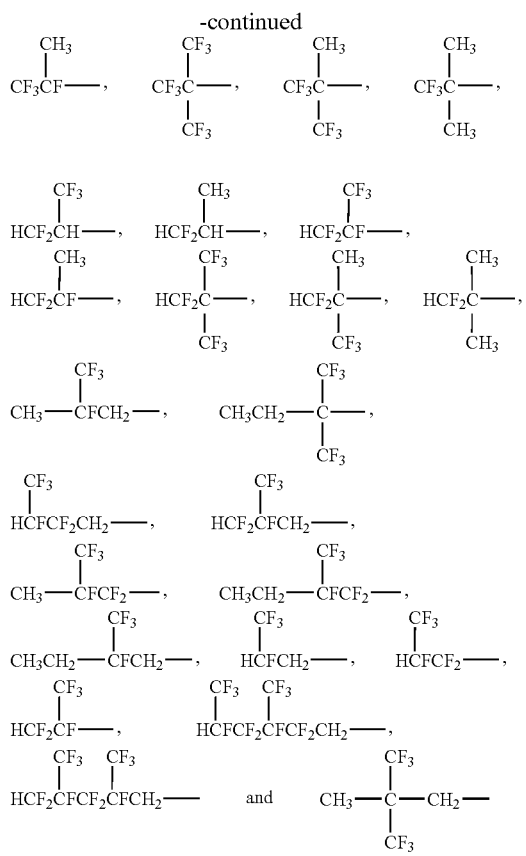

However when having branches such as —CH$_3$ and —CF$_3$, viscosity is easily increased, and therefore it is preferable that the number of such branches is small (one) or more preferably zero.

However when having branches such as —CH$_3$ and —CF$_3$, viscosity is easily increased, and therefore it is preferable that the number of such branches is small (one) or more preferably zero.

Examples of R$^{21}$ are linear or branched alkylene groups having 1 to 3 carbon atoms such as alkylene groups which may have fluorine atom. Examples of minimum structural units constituting such linear or branched alkylene groups are as raised below. R$^{21}$ is composed of those groups alone or a combination thereof.

(i) Minimum structural unit of linear type

—CH$_2$—, —CHF—, —CF$_2$—, —CHCl—, —CFCl— and —CCl$_2$—

(ii) Minimum structural unit of branched type

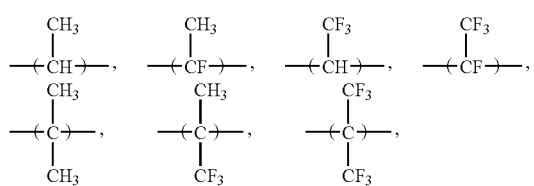

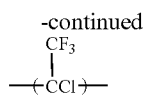

It is preferable that the alkylene group has a structural unit having no Cl among the above-mentioned examples, because a de-HCl reaction by a base does not occur and thus the structural unit is stable.

Further examples of the linear R$^{21}$ are —CH$_2$—, —CH$_2$CH$_2$— and —CF$_2$—, and especially —CH$_2$— and —CH$_2$CH$_2$— are preferable because solubility of the electrolyte salt can be enhanced more.

Preferable examples of the branched R$^{21}$ are those represented by the formula —(CX$^{10}$X$^{11}$)—, where X$^{10}$ is H, F, CH$_3$ or CF$_3$; X$^{11}$ is CH$_3$ or CF$_3$; when X$^{11}$ is CF$_3$, X$^{10}$ is H or CH$_3$. Especially those groups can enhance solubility of the electrolyte salt more.

Preferred examples of the fluorine-containing alkyl group (Ic) are, for instance, CF$_3$CF$_2$—, HCF$_2$CF$_2$—, H$_2$CFCF$_2$—, CH$_3$CF$_2$—, CF$_3$CF$_2$CF$_2$—, HCF$_2$CF$_2$CF$_2$—, H$_2$CFCF$_2$CF$_2$—, CH$_3$CF$_2$CF$_2$—, CF$_3$CH$_2$—, HCF$_2$CH$_2$—, CF$_3$CF$_2$CH$_2$—, HCF$_2$CF$_2$CH$_2$—, H$_2$CFCF$_2$CH$_2$—, CH$_3$CF$_2$CH$_2$—, CF$_3$CF$_2$CF$_2$CH$_2$—, HCF$_2$CF$_2$CF$_2$CH$_2$—, H$_2$CFCF$_2$CF$_2$CH$_2$—, CH$_3$CF$_2$CF$_2$CH$_2$—, CF$_3$CH$_2$CH$_2$—, HCF$_2$CH$_2$CH$_2$—, CF$_3$CF$_2$CH$_2$CH$_2$—, HCF$_2$CF$_2$CH$_2$CH$_2$—, H$_2$CFCF$_2$CH$_2$CH$_2$—, CH$_3$CF$_2$CH$_2$CH$_2$—, CF$_3$CF$_2$CF$_2$CH$_2$CH$_2$—, HCF$_2$CF$_2$CF$_2$CH$_2$CH$_2$—, H$_2$CFCF$_2$CF$_2$CH$_2$CH$_2$—, CH$_3$CF$_2$CF$_2$CH$_2$CH$_2$—,

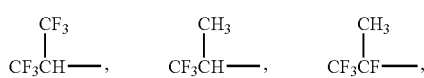

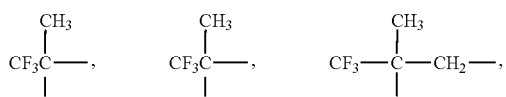

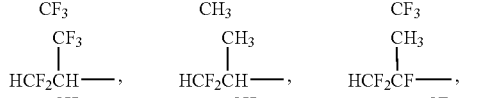

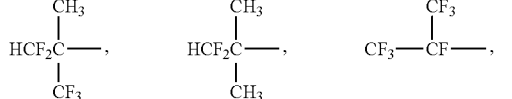

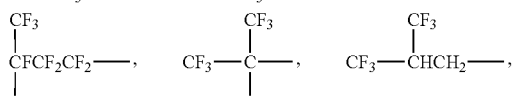

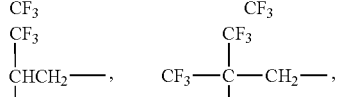

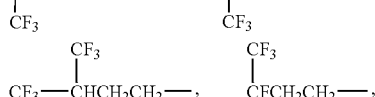

and the like.

Preferred examples of the fluorine-containing alkyl group (Ic) where $R^{21}$ is of linear type are, for instance, $CF_3CH_2-$, $HCF_2CH_2-$, $CF_3CF_2CH_2-$, $HCF_2CF_2CH_2-$, $H_2CFCF_2CH_2-$, $CH_3CF_2CH_2-$, $CF_3CF_2CF_2CH_2-$, $HCF_2CF_2CF_2CH_2-$, $H_2CFCF_2CF_2CH_2-$, $CH_3CF_2CF_2CH_2-$, $CF_3CH_2CH_2-$, $HCF_2CH_2CH_2-$, $CF_3CF_2CH_2CH_2-$, $HCF_2CF_2CH_2CH_2-$, $H_2CFCF_2CH_2CH_2-$, $CH_3CF_2CH_2CH_2-$, $CF_3CF_2CF_2CH_2CH_2-$, $HCF_2CF_2CF_2CH_2CH_2-$, $H_2CFCF_2CF_2CH_2CH_2-$, $CH_3CF_2CF_2CH_2CH_2-$,

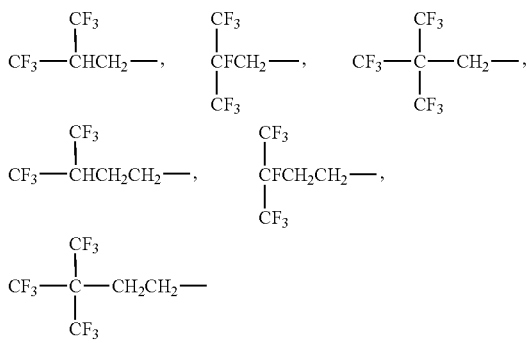

and the like.

Preferred examples of the fluorine-containing alkyl group (Ic) where $R^{21}$ is of branched type are, for instance,

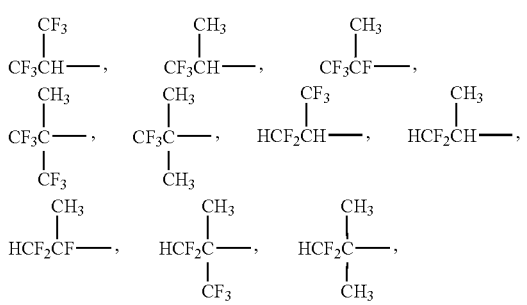

and the like.

In the cyclic carbonate (I), $X^1$ and $X^2$ are the same or different and each is H, F, Cl, $CF_3$ or $CH_3$; $X^3$ is H, F, Cl or an alkyl group in which hydrogen atom may be substituted with halogen atom and hetero atom may be contained in its chain.

$X^1$, $X^2$ and $X^3$ are the same or different atoms or organic groups and any of them are preferably H, F, Cl, $CF_3$ or $CH_3$, further preferably H, F or Cl because the molecule is desirably of small bulk. Particularly most preferable is H since in the case of a group or atom having a high electron-attracting effect, a coordination ability of the cyclic carbonate is lowered and solubility and ion conductivity of the electrolyte salt tend to be lowered.

In the case where $X^3$ is an alkyl group in which hydrogen atom may be substituted with halogen atom and hetero atom may be contained in its chain, preferable examples thereof are preferably linear or branched un-substituted alkyl groups having 1 to 15 carbon atoms, further preferably linear or branched un-substituted alkyl groups having 1 to 4 carbon atoms; fluorine-containing alkyl groups having preferably 1 to 15 carbon atoms, further preferably 1 to 4 carbon atoms; the same fluorine-containing ether groups (Ia) as the afore-mentioned $Rf^1$; non-fluorine-containing linear or branched ether groups having preferably 1 to 15 carbon atoms, further preferably 1 to 4 carbon atoms, and the like.

Examples of the linear or branched un-substituted alkyl groups are, for instance, $CH_3-$, $C_2H_5-$, $C_3H_7-$, $C_4H_9-$, $(CH_3)_2CH-$, $CH_3C(CH_3)_2-$ and the like.

Examples of the fluorine-containing alkyl groups are $CF_3-$, $CF_3CH_2-$, $CF_3CF_2-$, $CF_3CF_2CH_2-$, $CF_3CF_2CF_2-$, $CF_3CH_2CF_2-$, $CF_3CH_2CH_2-$, $CF_3CF_2CH_2CH_2-$, $CF_3CF_2CF_2CH_2-$, $CF_3CF_2CF_2CF_2-$, $CF_3CH_2CF_2CH_2-$, $HCF_2CF_2CH_2-$, $FCH_2CF_2CF_2-$, $FCH_2CF_2CH_2-$, $HCF_2CF_2CF_2CF_2CH_2-$ and the like, and examples of the fluorine-containing alkyl groups of branched type are

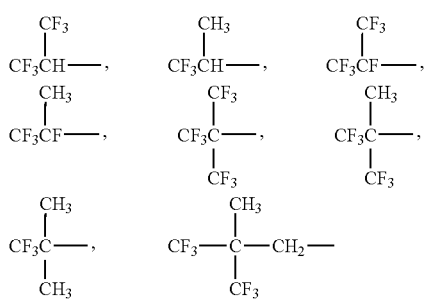

and the like. Further preferable are those having $HCF_2$ or $CF_3$ at an end thereof since a viscosity is decreased.

In addition, when $Rf^1$ is a fluorine-containing alkyl group, it is preferable that any of $X^1$, $X^2$ and $X^3$ are H, and when $X^3$ is a fluorine-containing alkyl group, it may be the same as or different from the fluorine-containing alkyl group of $Rf^1$.

Examples of the fluorine-containing ether group are the same as the examples of the fluorine-containing ether group explained supra.

Examples of the non-fluorine-containing linear or branched ether group are, for instance, $CH_3CH_2-OCH_2CH_2-$, $CH_3-OCH_2CH_2-$, $CH_3CH(CH_3)-OCH_2CH_2-$ and the like, and examples of the fluorine-containing linear or branched ether group having $CF_3$ at its end are, for instance, $C_3F_7-OCF(CF_3)CH_2-$, $C_3F_7-OCF(CF_3)CF_2-$, $CF_3CH_2-OCH_2CH_2-$, $CF_3-OCH_2CH_2-$, $CF_3CF_2CH_2-OCH_2CH_2-$, $CF_3CH(CF_3)-OCH_2CH_2-$ and the like.

In the present invention, particularly preferred examples of the cyclic carbonate having a fluorine-containing ether group and the cyclic carbonate having a fluorine-containing alkoxyl group are raised below, but the present invention is not limited to them.

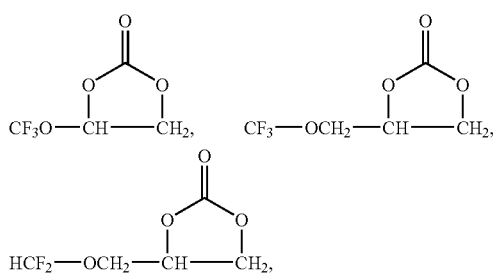

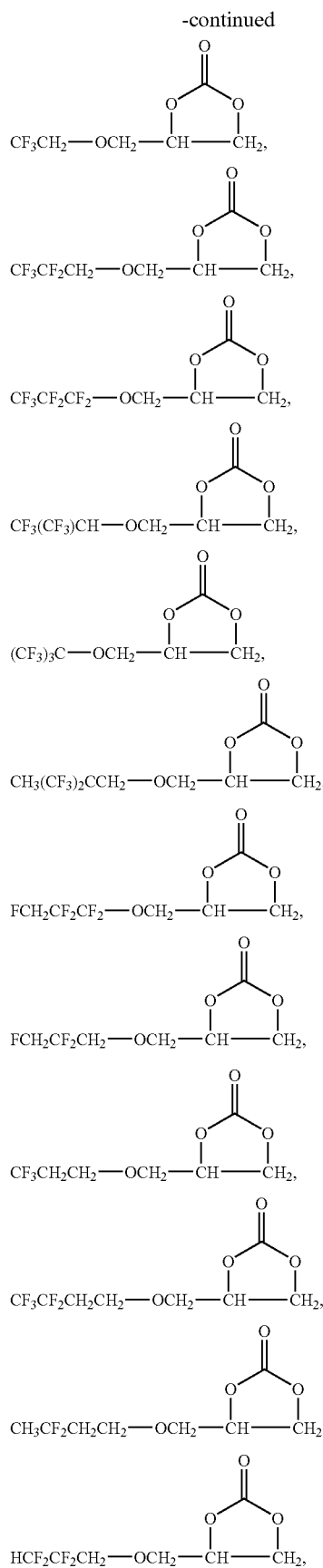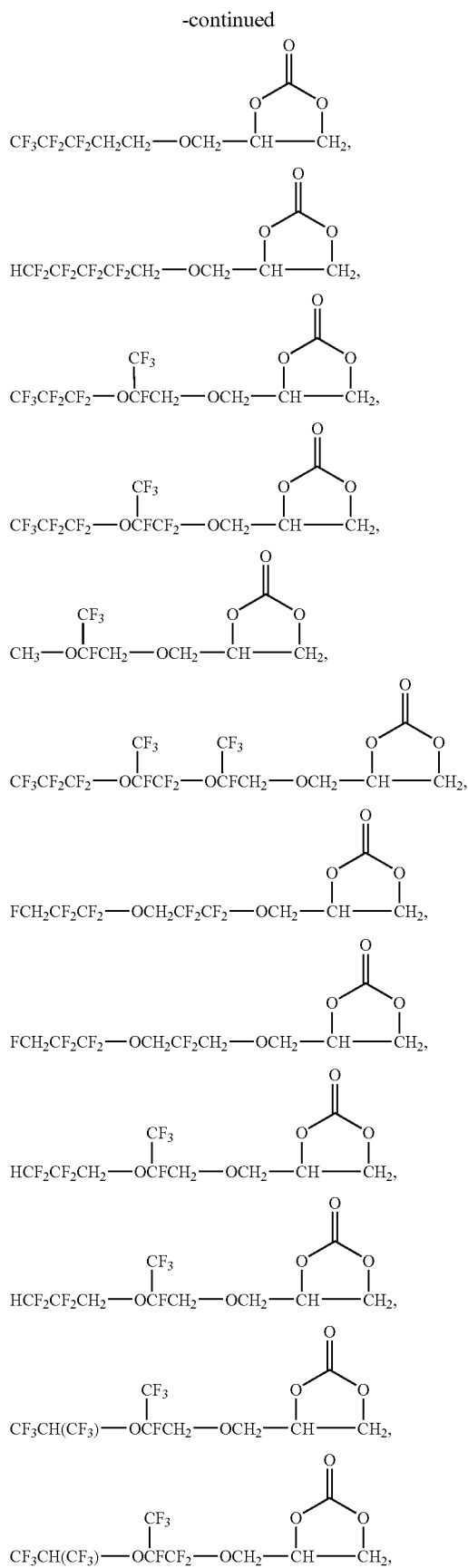

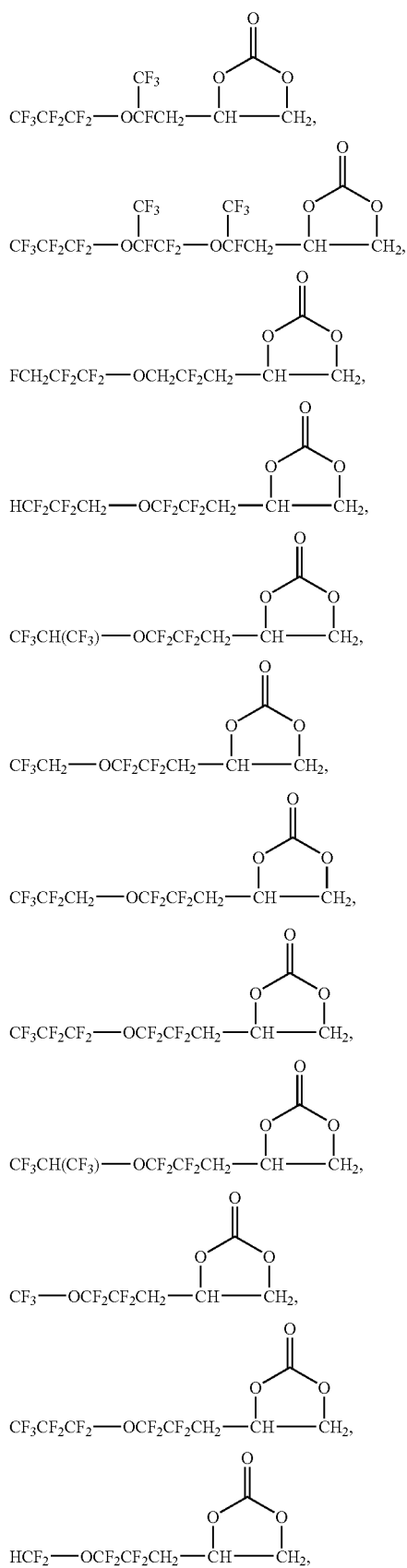
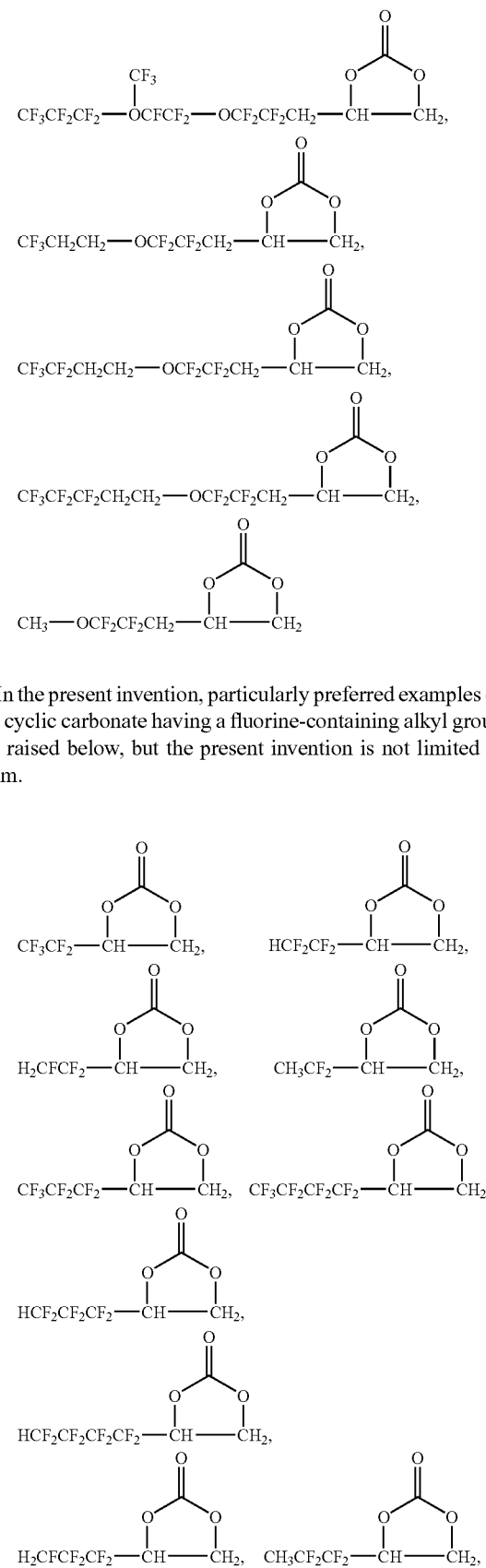
In the present invention, particularly preferred examples of the cyclic carbonate having a fluorine-containing alkyl group are raised below, but the present invention is not limited to them.

-continued

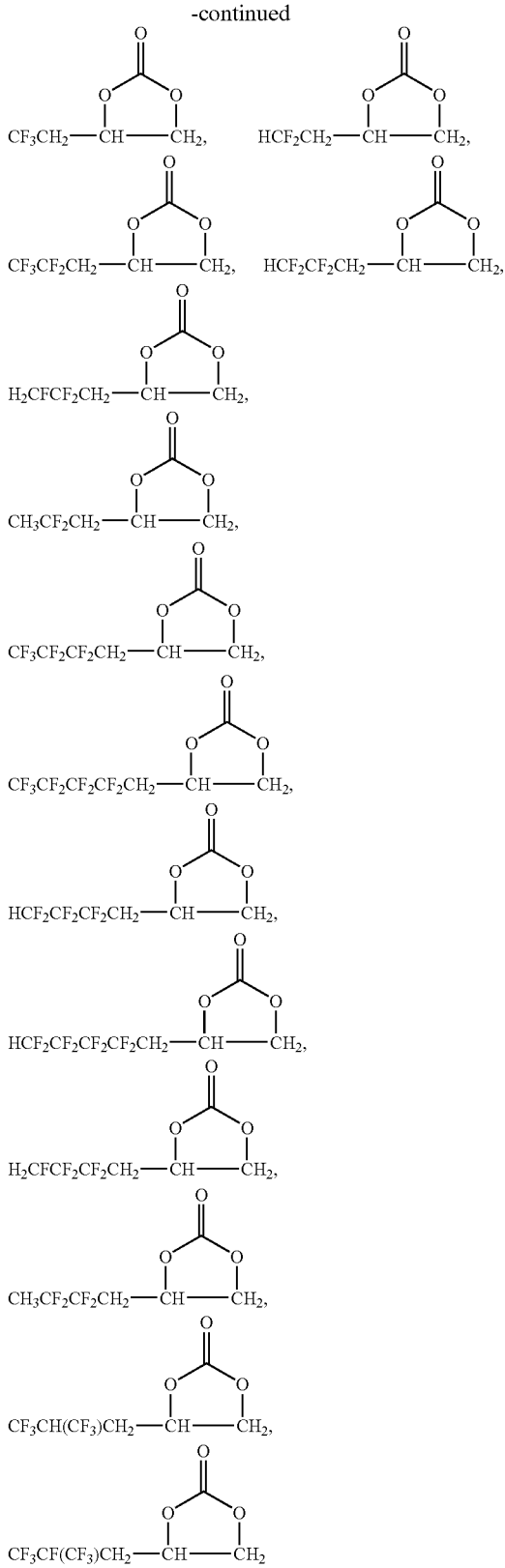

The fluorine-containing cyclic carbonate represented by the formula (I) is a novel compound which has not been disclosed in any prior publications.

Example of a method of synthesizing the cyclic carbonate having the fluorine-containing ether group (Ia) or the fluorine-containing alkoxyl group (Ib) as $Rf^1$ is a method of subjecting a fluorine-containing alcohol (I-a) having an ether group and represented by the formula (I-a):

$$Rf^1\text{—OH} \quad (\text{I-a})$$

where $Rf^1$ is as defined above, to the following reactions in the case where in the formula (I), any of $X^1$, $X^2$ and $X^3$ are H.

(1) A compound of the formula (I-b):

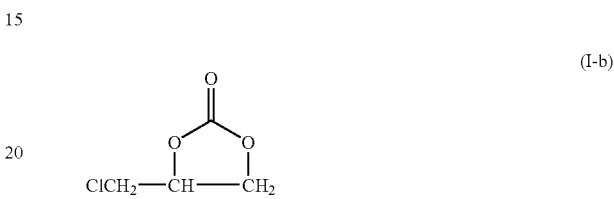

and the fluorine-containing alcohol (I-a) having an ether group are subjected to nucleophilic substitution in the presence of a base catalyst.

(2) A compound of the formula (I-c):

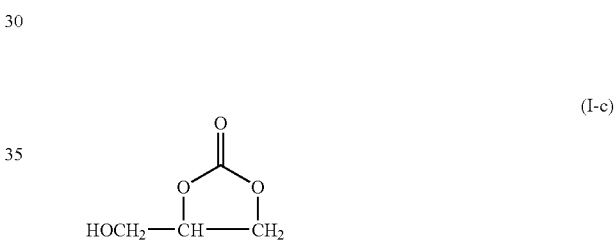

and the fluorine-containing alcohol (I-a) having an ether group are subjected to dehydration-condensation in the presence of an acid catalyst.

(3) After obtaining a compound of the formula (I-e):

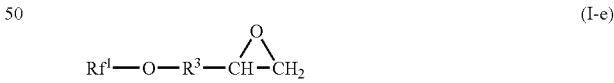

by subjecting an epoxy compound of the formula (I-d):

wherein $R^3$ is an alkylene group having 1 to 15 carbon atoms which may have an ether group, and the fluorine-containing alcohol (I-a) having an ether group to nucleophilic substitution, the obtained compound of the formula (I-e) is:

(3-1) reacted with $CO_2$ using, as a catalyst, a halogenated alkali metal such as LiBr, LiI, Kbr, KI, NaI or NaBr, or (3-2) hydrolyzed in the presence of a base catalyst or an acid catalyst, to prepare a diol compound of the formula (I-f):

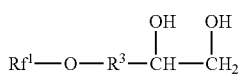

(I-f)

which is then reacted with $COCl_2$, $COF_2$, triphosgene or the like in the presence of a base catalyst.

Example of another method of synthesizing the epoxy compound (1-e) used in the synthesis method (3) is, for instance, the following method.

After carrying out the following reaction:

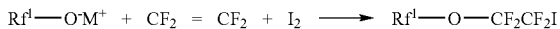

the obtained compound is reacted with:

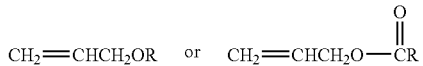

wherein R is an alkyl group or H, and thus

is obtained.

In the formula (I), in the case where any one of $X^1$, $X^2$ and $X^3$ is not H, for example, a method of synthesizing a carbonate from the epoxy compound of (3) can be adopted.

Also, it is possible that $Rf^1$—O—$R^3$—CH=CH—R is oxidized with $O_3$, $KMnO_4$, NaOCl or the like to be converted to the corresponding epoxy compound:

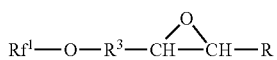

and then is converted to a cyclic carbonate by the above-mentioned method of (3-1) or (3-2).

Examples of a method of synthesizing a cyclic carbonate having the fluorine-containing alkyl group (Ic) as $Rf^1$ are, for instance the following methods.

(4) $Rf^1$—CH=$CH_2$ is reacted using $O_3$, $KMnO_4$ or NaOCl to synthesize a corresponding epoxy compound:

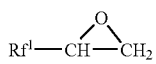

which is then converted to a cyclic carbonate by the above-mentioned method of (3-1) or (3-2).

(5) After $Rf^1$I is subjected to radical reaction with $CH_2$=$CHCH_2$OR or $CH_2$=$CHCH_2$OC(=O)R (R is an alkyl group or H) to obtain $Rf^1$—$CH_2$=$CHCHICH_2$OR or $Rf^1$—$CH_2CHICH_2$OC(=O)R, ring formation is carried out to synthesize a corresponding epoxy compound:

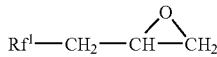

which is then converted to a cyclic carbonate by the above-mentioned method of (3-1) or (3-2).

In the present invention, in addition to the cyclic carbonate (I) having a fluorine-containing ether group or a fluorine-containing alkyl group, one or more kinds of other solvents (III) for dissolving the electrolyte salt may be mixed as a solvent for dissolving the electrolyte salt.

The other solvents (III) for dissolving the electrolyte salt may be non-fluorine-containing solvents such as hydrocarbon carbonate solvent, nitrile solvent, lactone solvent and ester solvent, and further fluorine-containing solvents other than the fluorine-containing cyclic carbonate (I). Particularly in the case where the cyclic carbonate is a solid, it is desirable to add the other solvents (III) for dissolving the electrolyte salt.

Examples of the non-fluorine-containing solvents are, for instance, ethylene carbonate, propylene carbonate, butylene carbonate, γ-butyrolactone, 1,2-dimethoxyethane, tetrahydrofuran, 2-methyltetrahydrofuran, 1,3-dioxolane, 4-methyl-1,3-dioxolane, methyl formate, methyl acetate, methyl propionate, dimethyl carbonate, ethyl methyl carbonate, diethyl carbonate, acetonitrile, propionitrile, succinonitrile, butyronitrile, isobutyronitrile, benzonitrile, glutaronitrile, dimethyl sulfoxide, methylpyrrolidone and the like. Particularly from the viewpoint of improvement in a dielectric constant, oxidation resistance and electrochemical stability, preferable are ethylene carbonate, propylene carbonate, diethyl carbonate, γ-butyrolactone, 1,2-dimethoxyethane, 1,3-dioxolane, acetonitrile, propionitrile, succinonitrile, butyronitrile, isobutyronitrile, benzonitrile and glutaronitrile.

Preferable examples of the fluorine-containing solvents other than the fluorine-containing cyclic carbonate (I) are, for instance, fluorine-containing chain carbonates disclosed in JP6-219992A, JP10-149840A, JP2001-256983A and JP2000-327634A and cyclic carbonates disclosed in JP5-325985A, JP10-189043A, JP2001-313075A, JP2003-168480A, JP8-37025A and JP10-233345A, especially fluorine-containing carbonates disclosed in JP6-219992A and JP2001-256983A, and fluorine-containing ethers disclosed in JP6-176768A, JP8-37024A, JP11-307123A and JP2000-294281A. In addition, chain carbonates represented by the formula:

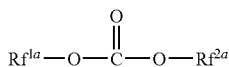

wherein $Rf^{1a}$ is a fluorine-containing alkyl group having, at its end, a moiety represented by the formula:

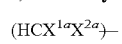

where $X^{1a}$ and $X^{2a}$ are the same or different and each is H or F, preferably a fluorine-containing alkyl group having a fluorine content of 10 to 76% by mass; $Rf^{2a}$ is a fluorine-containing alkyl group having the above-mentioned moiety or —$CF_3$ at its end, preferably a fluorine-containing alkyl group having a fluorine content of 10 to 76% by mass, chain carbonates represented by the formula:

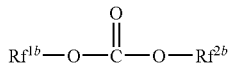

wherein $Rf^{1b}$ is a fluorine-containing ether group having —$CF_3$ at its end, preferably a fluorine-containing ether group having a fluorine content of 10 to 76% by mass; $Rf^{2b}$ is a fluorine-containing ether group or a fluorine-containing alkyl group, preferably a fluorine-containing ether group or a fluorine-containing alkyl group having a fluorine content of 10 to 76% by mass, chain carbonates represented by the formula:

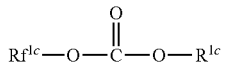

wherein $Rf^{1c}$ is a fluorine-containing ether group having, at its end, a moiety represented by the formula:

$$HCFX^{1c}—$$

where $X^{1c}$ is H or F, preferably a fluorine-containing ether group having a fluorine content of 10 to 76% by mass; $R^{1c}$ is an alkyl group, in which hydrogen atom may be substituted with halogen atom and hetero atom may be contained in its chain, and the like may be used in combination. Particularly in an application to capacitors requiring a high withstand voltage, it is desirable to use the above-mentioned fluorine-containing chain carbonates as the solvent (III) for dissolving the electrolyte salt.

Preferable examples of the fluorine-containing chain carbonates being usable in combination are, for instance, chain carbonates represented by the formula:

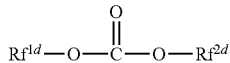

in which fluorine-containing groups such as $H(CF_2)_2CH_2$—, $FCH_2CF_2CH_2$—, $H(CF_2)_2CH_2CH_2$—, $CF_3CF_2CH_2$—, $CF_3CH_2CH_2$—, $CF_3CF(CF_3)CH_2CH_2$—, $C_3F_7OCF(CF_3)CH_2$—, $CF_3OCF(CF_3)CH_2$— and $CF_3OCF_2$— are used in combination as $Rf^{1d}$ and $Rf^{2d}$.

On the other hand, fluorine-containing ethers are excellent in an effect of enhancing non-flammability and are useful but are low in compatibility with non-fluorine-containing solvents for dissolving an electrolyte salt, particularly hydrocarbon carbonates such as ethylene carbonate and diethylene carbonate. When a fluorine-containing ether is mixed in a given amount or more to a non-fluorine-containing solvent for dissolving an electrolyte salt, in some cases, separation into two layers occur. However, in the presence of the fluorine-containing cyclic carbonate (I), a homogeneous solution of these three components can be easily formed. It is conjectured that the fluorine-containing cyclic carbonate (I) functions as a compatibilizer for making the fluorine-containing ether compatible with the non-fluorine-containing solvent for dissolving an electrolyte salt. Accordingly, further enhancement of non-flammability can be expected in the case of a homogeneous electrolytic solution comprising the fluorine-containing cyclic carbonate (I), the electrolyte salt (II), the non-fluorine-containing solvent for dissolving the electrolyte salt and the fluorine-containing ether.

The amount of the other solvent (III) for dissolving the electrolyte salt is not less than 1% by mass, preferably not less than 10% by mass, particularly preferably not less than 20% by mass in the whole solvents for dissolving the electrolyte salt, from the viewpoint of satisfactory solubility of the electrolyte salt. An upper limit thereof is 98% by mass, preferably 90% by mass, especially 80% by mass from the viewpoint of flame retardance, low temperature characteristics and a withstand voltage.

Particularly in the case of capacitors, a higher concentration of the electrolyte salt in the electrolytic solution is desirable because of capability of coping with a large current density. From this point of view, it is preferable to jointly use hydrocarbon solvents being excellent in solubility of the electrolyte salt, particularly the above-mentioned fluorine-containing carbonates, propylene carbonate, γ-butyrolactone, acetonitrile, 1,3-dioxolane and the like.

Furthermore, particularly in the case of using a higher voltage for capacitor application, since the fluorine-containing cyclic carbonate of the present invention has a high voltage for oxidation resistance, it is preferable that the other solvents and electrolyte salt to be used in combination also have a high voltage for oxidation resistance. From this point of view, especially the above-mentioned fluorine-containing carbonates, propylene carbonate and γ-butyrolactone are preferable as the other solvent, and preferable as the electrolyte salt are salts having an anion such as $BF_4^-$, $PF_6^-$, $AsF_6^-$ or $SbF_6^-$ out of those explained infra.

Next, the electrolyte salt (II) which is another component of the electrolytic solution of the present invention is explained.

Examples of the electrolyte salt (II) usable in the present invention are known metallic salts, liquid salts (ionic liquids), inorganic polymer salts, organic polymer salts and the like.

Of these electrolyte salts, there are particularly suitable compounds depending on purposes of the electrolytic solution. Then examples of suitable electrolyte salts classified by applications are raised below, but the electrolyte salt is not limited to them. The electrolyte salts raised below can be optionally used for other applications.

Firstly, various organic metallic salts of boron anion type, oxygen anion type, nitrogen anion type, carbon anion type and phosphorus anion type can be used as metallic salts for lithium secondary batteries, and it is preferable to use metallic salts of oxygen anion type and nitrogen anion type.

Specifically $CF_3SO_3Li$, $C_4F_9SO_3Li$, $C_8F_{17}SO_3Li$, $CH_3SO_3Li$, $C_6H_5SO_3Li$, $LiSO_3C_2F_4SO_3Li$, $CF_3CO_2Li$, $C_6HsCO_2Li$, $Li_2C_4O_4$ and the like are used as the metallic salt of oxygen anion type, and it is particularly preferable to use $CF_3SO_3Li$, $C_4F_9SO_3Li$ and $C_8F_{17}SO_3Li$.

Examples of the metallic salt of nitrogen anion type are $(CF_3SO_2)_2NLi$ (TFSI), $(C_2F_5SO_2)_2NLi$ (BETI), $(CF_3SO_2)(C_4F_9SO_2)NLi$, $(CF_3SO_2)(C_8F_{17}SO_2)NLi$, $(CF_3CO)_2NLi$, $(CF_3CO)(CF_3CO_2)NLi$, $((CF_3)_2CHOSO_2)_2NLi$, $(C_2F_5CH_2OSO_2)_2NLi$ and the like, and it is particularly preferable to use $(CF_3SO_2)_2NLi$ (TFSI) and $(C_2F_5SO_2)_2NLi$ (BETI).

Examples of the inorganic metallic salts which can be used are LiPF$_6$, LiBF$_4$, LiAsF$_6$, LiSbF$_6$, LiClO$_4$, and the like, and it is particularly preferable to use LiPF$_6$ and LiBF$_4$.

Examples of an organic metallic salt for capacitors are tetraalkyl quaternary ammonium salts represented by (Me)$_x$(Et)$_y$N, where Me is methylene, Et is ethylene, x and y are the same or different, and each is 0 or an integer of 1 to 4 and x+y=4. Specifically there are Et$_4$NBF$_4$, Et$_4$NClO$_4$, Et$_4$NPF$_6$, Et$_4$NAsF$_6$, Et$_4$NSbF$_6$, Et$_4$NCF$_3$SO$_3$, Et$_4$N(CF$_3$SO$_2$)$_2$N, Et$_4$NC$_4$F$_9$SO$_3$, Et$_3$MeBF$_4$, Et$_3$MeClO$_4$, Et$_3$MePF$_6$, Et$_3$MeAsF$_6$, Et$_3$MeSbF$_6$, Et$_3$MeCF$_3$SO$_3$, Et$_3$Me(CF$_3$SO$_2$)$_2$N and Et$_3$MeC$_4$F$_9$SO$_3$, and it is particularly preferable to use Et$_4$NBF$_4$, Et$_4$NPF$_6$, Et$_4$NSbF$_6$ and Et$_4$NAsF$_6$. In addition, of these tetraalkyl quaternary ammonium salts, it is desirable to use quaternary ammonium salts in which one or two alkyls are ethers, from the viewpoint of decrease in viscosity. For example, N,N-diethyl-N-methyl-N-(2-methoxyethyl)ammonium salt and the like are preferable since viscosity is low. Also spiro-bipyrrolidinium or its salt obtained by substituting a part of hydrogen atoms of spiro-bipyridinium with fluorine atoms is preferable because viscosity is low and particularly low temperature characteristics are excellent. Also among tetraalkyl quaternary ammonium salts, those in which alkyl groups are one or more fluorine-containing alkyl groups or fluorine-containing ether groups are preferable from the viewpoint of enhancing oxidation resistance and lowering viscosity. Further imidazolium salts having fluorine atom, fluorine-containing alkyl group or fluorine-containing ether group are preferable from the viewpoint of enhancing oxidation resistance and lowering viscosity. Preferable examples as anion species of the salts are BF$_4^-$, PF$_6^-$, AsF$_6^-$ and SbF$_6^-$ which are excellent in oxidation resistance.

Examples of an inorganic metallic salt which can be used are LiPF$_6$, LiBF$_4$, LiAsF$_6$, LiSbF$_6$, LiClO$_4$, NaPF$_6$, NaBF$_4$, NaAsF$_6$, NaClO$_4$, KPF$_6$, KBF$_4$, KAsF$_6$, KClO$_4$ and the like, and it is particularly preferable to use LiPF$_6$, LiBF$_4$, LiSbF$_6$, LiAsF$_6$, NaPF$_6$ and NaBF$_4$.

Examples of electrolyte salts for dye-sensitized solar cell are R$^6$R$^7$R$^8$R$^9$NI, where R$^6$ to R$^9$ are the same or different and each is an alkyl group having 1 to 3 carbon atoms, LiI, NaI, KI,

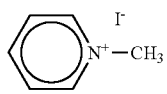

and the like.

When a liquid salt is used as the electrolyte salt (II), there are salts of an organic or inorganic anion with polyalkylimidazolium cation, N-alkylpyridinium cation, tetraalkylammonium cation, tetraalkylammonium cation having ether chain, tetraalkylphosphonium cation or spirobipyrrolidinium cation for lithium secondary batteries, capacitors and dye-sensitized solar cells, and particularly 1,3-dialkylimidazolium salt, spirobipyrrolidinium salt and alkylammonium salt having ether chain are preferable. In addition, of the above-mentioned salts, those in which a part of cations are substituted with fluorine atoms are desirable from the viewpoint of lowering viscosity and enhancing oxidation resistance.

Examples of preferable polyalkylimidazolium cation are 1,3-dialkylimidazolium cations such as 1-ethyl-3-methylimidazolium cation (EMI$^+$) and 1-butyl-3-methylimidazolium cation (BMI$^+$); trialkylimidazolium cations such as 1,2-dimethyl-3-propylimidazolium cation (DMPI$^+$) and the like. In addition, cations obtained by substituting a part of hydrogen atoms of these cations with fluorine atoms are further preferable.

Examples of preferable inorganic anion are, for instance, AlCl$_4^-$, BF$_4^-$, PF$_6^-$, AsF$_6^-$, I$^-$ and the like, and examples of preferable organic anion are, for instance, CH$_3$COO$^-$, CF$_3$COO$^-$, C$_3$F$_7$COO$^-$, CF$_3$SO$_3^-$, C$_4$F$_9$SO$_3^-$, (CF$_3$SO$_2$)$_2$N$^-$, (C$_2$F$_5$SO$_2$)$_2$N$^-$ and the like.

Specifically there are EMIAlCl$_4$, EMIBF$_4$, EMIPF$_6$, EMIAsF$_6$, EMII, EMICH$_3$COO, EMICF$_3$COO, EMIC$_3$F$_7$COO, EMICF$_3$SO$_3$, EMIC$_4$F$_9$SO$_3$, EMI(CF$_3$SO$_2$)$_2$N, EMI(C$_2$F$_5$SO$_2$)$_2$N, BMIAlCl$_4$, BMIBF$_4$, BMIPF$_6$, BMIAsF$_6$, BMII, BMICH$_3$COO, BMICF$_3$COO, BMIC$_3$F$_7$COO, BMICF$_3$SO$_3$, BMIC$_4$F$_9$SO$_3$, BMI(CF$_3$SO$_2$)$_2$N, BMI(C$_2$F$_5$SO$_2$)$_2$N, DMPIAlCl$_4$, DMPIBF$_4$, DMPIPF$_6$, DMPIAsF$_6$, DMPII, DMPICH$_3$COO, DMPICF$_3$COO, DMPIC$_3$F$_7$COO, DMPICF$_3$SO$_3$, DMPIC$_4$F$_9$SO$_3$, DMPI(CF$_3$SO$_2$)$_2$N, DMPI(C$_2$F$_5$SO$_2$)$_2$N and the like.

Particularly for dye-sensitized solar cells, iodides such as EMII, BMII and DMPII are suitable.

The amount of electrolyte salt (II) varies depending on a required current density, application, kind of an electrolyte salt and the like, and it is preferable that the amount is not less than 0.1 part by mass, further not less than 1 part by mass, especially not less than parts by mass, and not more than 200 parts by mass, further not more than 100 parts by mass, especially not more than 50 parts by mass based on 100 parts by mass of the fluorine-containing cyclic carbonate (I).

The electrolytic solution of the present invention is prepared by dissolving the electrolyte salt (II) in the fluorine-containing cyclic carbonate (I) or in a solvent comprising the carbonate (I) and the solvent (III) for dissolving the electrolyte salt.

In addition, the electrolytic solution of the present invention may be in the form of gel (plasticized) prepared in combination with a polymer material which dissolves or swells in the solvent used for the electrolytic solution of the present invention.

Examples of the polymer material are known polyethylene oxide, polypropylene oxide and modified compounds thereof (JP8-222270A, JP2002-100405A); fluorine-containing resins such as polyacrylate polymer, polyacrylonitrile, polyvinylidene fluoride and vinylidene fluoride-hexafluoropropylene copolymer (JP4-506726A, JP8-507407A, JP10-294131A); complexes of those fluorine-containing resins with hydrocarbon resins (JP11-35765A, JP11-86630A) and the like. It is particularly desirable to use polyvinylidene fluoride and vinylidene fluoride-hexafluoropropylene copolymer as the polymer material for the gel electrolyte.

In addition, an ion-conducting compound disclosed in Japanese Patent Application No. 2004-301934 can be used.

This ion-conducting compound is a non-crystalline fluorine-containing polyether compound having a fluorine-containing group in its side chain and is represented by the formula (1-1):

wherein D is represented by the formula (2-1):

where D1 is an ether unit having a fluorine-containing ether group in its side chain and represented by the formula (2a):

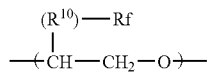
(2a)

where Rf is a fluorine-containing ether group which may have a crosslinkable functional group; $R^{10}$ is a group or bond bonding Rf to a trunk chain;

FAE is an ether unit having a fluorine-containing alkyl group in its side chain and represented by the formula (2b):

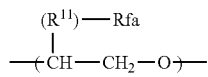
(2b)

where Rfa is hydrogen atom or a fluorine-containing alkyl group which may have a crosslinkable functional group; $R^{11}$ is a group or bond bonding Rfa to the trunk chain;

AE is an ether unit represented by the formula (2c):

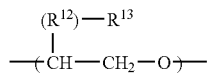
(2c)

where $R^{13}$ is hydrogen atom, an alkyl group which may have a crosslinkable functional group, an aliphatic cyclic hydrocarbon group which may have a crosslinkable functional group or an aromatic hydrocarbon group which may have a crosslinkable functional group;

$R^{12}$ is a group or bond bonding $R^{13}$ to the trunk chain;

Y is a unit having at least one of the formulae (2d-1) to (2d-3):

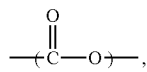
(2d-1)

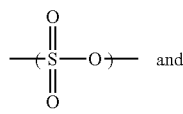
(2d-2) and

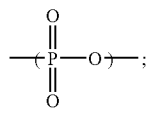
(2d-3)

n is 0 or an integer of 1 to 200; m is 0 or an integer of 1 to 200; p is 0 or an integer of 1 to 10,000; q is an integer of 1 to 100; n+m is not 0, and the order of bonding of D1, FAE, AE and Y is not specified;

A and B are the same or different and each is hydrogen atom, an alkyl group which may have fluorine atom and/or a crosslinkable functional group, a phenyl group which may have fluorine atom and/or a crosslinkable functional group, a —COOH group, —$OR^{14}$ where $R^{14}$ is hydrogen atom or an alkyl group which may have fluorine atom and/or a crosslinkable functional group, an ester group or a carbonate group (when the end of D is oxygen atom, A and B are not a —COOH group, —$OR^{14}$, an ester group and a carbonate group).

To the electrolytic solution of the present invention may be blended other additives as case demands. Examples of other additives are, for instance, metallic oxides, glass and the like.

It is preferable that the electrolytic solution of the present invention does not freeze and the electrolyte salt is not precipitated at low temperatures (for example, at 0° C. and –20° C.). Specifically the viscosity at 0° C. is preferably not more than 100 mPa·s, more preferably not more than 30 mPa·s, particularly preferably not more than 15 mPa·s. Further specifically the viscosity at –20° C. is preferably not more than 100 mPa·s, more preferably not more than 40 mPa·s, particularly preferably not more than 15 mPa·s.

The electrolytic solution of the present invention can enhance flame retardance, low temperature characteristics, withstand voltage, solubility of the electrolyte salt and compatibility with hydrocarbon solvents at the same time, and therefore is suitable as an electrolytic solution for electrochemical devices.

Namely, the present invention relates to the electrochemical device provided with the above-mentioned electrolytic solution. Examples of electrochemical device are lithium secondary battery, capacitor (electric double layer capacitor), radical battery, solar cell (especially dye-sensitized solar cell), fuel cell, various electrochemical sensors, electrochromic device, electrochemical switching element, aluminum electrolytic capacitor, tantalum electrolytic capacitor and the like, and lithium secondary battery and electric double layer capacitor, especially electric double layer capacitor having a withstand voltage of not less than 3.5 V are suitable. While a high capacity electric double layer capacitor is required to be stable at a withstand voltage of not less than 3.0 V, the electric double layer capacitor of the present invention sufficiently satisfies such a requirement.

In addition, the electrolytic solution of the present invention can be used as an ion conductor for an antistatic coating material.

EXAMPLES

The present invention is then explained by means of Examples and Comparative Examples, but is not limited to them.

The methods of measurement employed in the present invention are as follows.

(1) NMR: AC-300 Available from BRUKER is Used.
$^{19}$F-NMR:
Measuring condition: 282 MHz (trichlorofluoromethane=0 ppm)
$^{1}$H-NMR:
Measuring condition: 300 MHz (tetramethylsilane=0 ppm)

(2) IR:
Measurement is carried out at room temperature with a Fourier-transform infrared spectrophotometer 1760X available from Perkin Elmer Co., Ltd.

(3) Fluorine Content:
The fluorine content is obtained by burning 10 mg of a sample by an oxygen flask combustion method, absorbing cracked gas in 20 ml of de-ionized water and then measuring a fluorine ion concentration in the fluorine ion-containing solution through a fluoride-ion selective electrode method (using a fluorine ion meter model 901 available from Orion) (% by mass).

Preparation Example 1

Into a 100 ml stainless steel autoclave were poured 40 g (212 mmol) of a fluorine-containing epoxy compound having $HCF_2$ at an end of its side chain and represented by:

350.0 mg (4.03 mmol) of LiBr and 40 ml of N-methylpyrrolidone (NMP), and the inside of the autoclave was evacuated with stirring. Then $CO_2$ equivalent to 1 MPa was introduced to the inside of a system at room temperature, and the temperature inside the system was elevated to 100° C. to start a reaction. As the reaction proceeded, the inside pressure was lowered, and therefore $CO_2$ was further introduced until the pressure inside the system became stable at 1 MPa. When the pressure inside the system became stable, the inside of the system was brought to room temperature and the reaction was terminated. The obtained reaction solution was added to 1N aqueous solution of HCl, and the obtained lower layer was distilled under reduced pressure (2 mmHg) to obtain a cyclic carbonate having a fluorine-containing ether group as a distillate at 133° C. (yield: 98%).

As a result of an analysis of this product by $^{19}$F-NMR and $^1$H-NMR, it was confirmed that the product was a fluorine-containing cyclic carbonate:

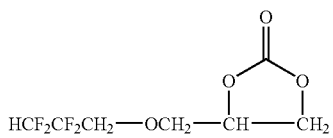

in which $Rf^1$ is a fluorine-containing ether group having $HCF_2$ at its end.

$^{19}$F-NMR: (neat): −139.0 ppm (2F), −125 ppm (2F)

$^1$H-NMR: (neat): 3.51 to 3.76 ppm (4H), 4.09 to 4.29 ppm (2H), 4.32 to 4.35 ppm (1H), 5.66 to 5.96 ppm (1H)

In addition, a stretching vibration of a carbonyl group was confirmed at 1,797 cm$^{-1}$ by measuring with IR.

The fluorine content of this fluorine-containing cyclic carbonate was 32.8% by mass.

Preparation Example 2

Into a 100 ml stainless steel autoclave were poured 30.11 g (80.6 mmol) of a fluorine-containing epoxy compound having $CF_3$ at an end of its side chain and represented by:

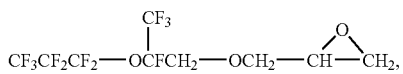

370.51 mg (4.27 mmol) of LiBr and 30 ml of NMP, and the inside of the autoclave was evacuated with stirring. Then $CO_2$ equivalent to 1.2 MPa was introduced to the inside of a system at room temperature, and the temperature inside the system was elevated to 100° C. to start a reaction. As the reaction proceeded, the inside pressure was lowered, and therefore $CO_2$ was further introduced until the pressure inside the system became stable at 1.2 MPa. When the pressure inside the system became stable, the inside of the system was brought to room temperature and the reaction was terminated. The obtained reaction solution was added to 1N aqueous solution of HCl, and the obtained lower layer was distilled under reduced pressure (0.3 mmHg) to obtain a cyclic carbonate having a fluorine-containing ether group as a distillate at 120° C. (yield: 67%).

As a result of an analysis of this product by $^{19}$F-NMR and $^1$H-NMR, it was confirmed that the product was a fluorine-containing cyclic carbonate:

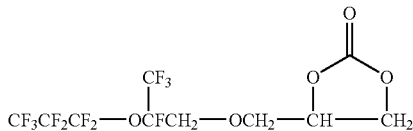

in which $Rf^1$ is a fluorine-containing ether group having $CF_3$ at its end.

$^{19}$F-NMR: (neat): −135.0 to −134.7 ppm (1F), −131.4 to −131.3 ppm (2F), −84.1 to −84.0 ppm (4F), −83.1 to −83.0 ppm (4F)

$^1$H-NMR: (neat): 3.69 to 3.85 ppm (2H), 4.07 to 4.11 ppm (2H), 4.23 to 4.29 ppm (1H), 4.41 to 4.48 ppm (1H), 4.83 to 4.85 ppm (1H)

In addition, a stretching vibration of a carbonyl group was confirmed at 1,799.9 cm$^{-1}$ by measuring with IR.

The fluorine content of this fluorine-containing cyclic carbonate was 50.2% by mass.

Preparation Example 3

Into a 100 ml stainless steel autoclave were poured 40 g (72 mmol) of a fluorine-containing epoxy compound having $CF_3$ at an end of its side chain and represented by:

312.0 mg (3.60 mmol) of LiBr and 40 ml of NMP, and the inside of the autoclave was evacuated with stirring. Then $CO_2$ equivalent to 1 MPa was introduced to the inside of a system at room temperature, and the temperature inside the system was elevated to 100° C. to start a reaction. As the reaction proceeded, the inside pressure was lowered, and therefore $CO_2$ was further introduced until the pressure inside the system became stable at 1 MPa. When the pressure inside the system became stable, the inside of the system was brought to room temperature and the reaction was terminated. The obtained reaction solution was added to 1N aqueous solution of HCl, and the obtained lower layer was distilled under reduced pressure (0.3 mmHg) to obtain a cyclic carbonate having a fluorine-containing ether group as a distillate at 165° C. (yield: 51%).

As a result of an analysis of this product by $^{19}$F-NMR and $^1$H-NMR, it was confirmed that the product was a fluorine-containing cyclic carbonate:

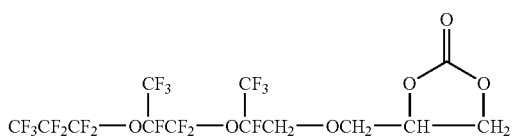

in which $Rf^1$ is a fluorine-containing ether group having $CF_3$ at its end.

$^{19}$F-NMR: (neat): −146.2 to −145.9 ppm (1F), −134.9 to −134.1 ppm (1F), −131.3 to −131.0 ppm (1F), −83.8 to −83.6 ppm (3F), −83.0 to −82.9 ppm (5F), −81.4 to −81.3 ppm (3F), $^1$H-NMR: (neat): 4.05 to 4.22 ppm (2H), 4.83 to 4.90 ppm (1H), 5.25 ppm (1H)

In addition, a stretching vibration of a carbonyl group was confirmed at 1,799.8 cm$^{-1}$ by measuring with IR.

The fluorine content of this fluorine-containing cyclic carbonate was 55.5% by mass.

Preparation Example 4

Into a 100 ml stainless steel autoclave were poured 47.38 g (269 mmol) of a fluorine-containing epoxy compound having, a fluorine-containing alkyl group in its side chain and represented by:

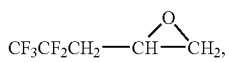

1.2 g (13.5 mmol) of LiBr and 50 ml of NMP, and the inside of the autoclave was evacuated with stirring. Then $CO_2$ equivalent to 1.2 MPa was introduced to the inside of a system at room temperature, and the temperature inside the system was elevated to 100° C. to start a reaction. As the reaction proceeded, the inside pressure was lowered, and therefore $CO_2$ was further introduced until the pressure inside the system became stable at 1.2 MPa. When the pressure inside the system became stable, the inside of the system was brought to room temperature and the reaction was terminated. The obtained reaction solution was added to 1N aqueous solution of HCl, and white solid precipitated in a lower layer. The obtained solid was collected with a funnel, followed by vacuum drying to obtain a cyclic carbonate having a fluorine-containing alkyl group in its side chain (yield: 98%).

As a result of an analysis of this product by $^{19}$F-NMR and $^1$H-NMR, it was confirmed that the product was a fluorine-containing cyclic carbonate of five-membered ring represented by:

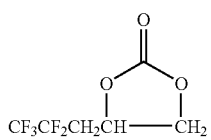

and having a fluorine-containing alkyl group in its side chain.

$^{19}$F-NMR: (neat): −85.73 ppm (3F), −117.89 to −114.78 ppm (2F)

$^1$H-NMR: (neat): 2.89 ppm (2H), 4.32 to 4.38 ppm (1H), 4.76 to 4.82 ppm (1H), 5.22 to 5.32 ppm (1H)

In addition, a stretching vibration of a carbonyl group was confirmed at 1,797 cm$^{-1}$ by measuring with IR.

The fluorine content of this fluorine-containing cyclic carbonate was 43.2% by mass.

Preparation Example 5

Into a 300 ml stainless steel autoclave were poured 59.89 g (217 mmol) of the following fluorine-containing epoxy compound having a fluorine-containing alkyl group in its side chain and represented by:

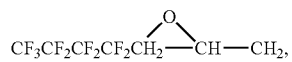

1.38 g (15.9 mmol) of LiBr and 60 ml of NMP, and the inside of the autoclave was evacuated with stirring. Then $CO_2$ equivalent to 1.2 MPa was introduced to the inside of a system at room temperature, and the temperature inside the system was elevated to 100° C. to start a reaction. As the reaction proceeded, the inside pressure was lowered, and therefore $CO_2$ was further introduced until the pressure inside the system became stable at 1.2 MPa. When the pressure inside the system became stable, the inside of the system was brought to room temperature and the reaction was terminated. The obtained reaction solution was added to 1N aqueous solution of HCl, and white solid precipitated in a lower layer. The obtained solid was collected with a funnel, followed by vacuum drying to obtain a cyclic carbonate having a fluorine-containing alkyl group in its side chain (yield: 85%).

As a result of an analysis of this product by $^{19}$F-NMR and $^1$H-NMR, it was confirmed that the product was a fluorine-containing cyclic carbonate of five-membered ring represented by:

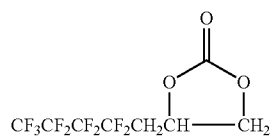

and having a fluorine-containing alkyl group in its side chain.

$^{19}$F-NMR: (neat): −82.57 to −82.47 ppm (3F), −114.17 to −113.88 ppm (2F), −125.91 to −125.79 ppm (2F), −127.52 to −127.34 ppm (2F) $^1$H-NMR: (neat): 2.89 ppm (2H), 4.32 to 4.38 ppm (1H), 4.76 to 4.82 ppm (1H), 5.22 to 5.32 ppm (1H)

In addition, a stretching vibration of a carbonyl group was confirmed at 1,797 cm$^{-1}$ by measuring with IR.

The fluorine content of this fluorine-containing cyclic carbonate was 53.4% by mass.

Preparation Example 6

Into a 300 ml stainless steel autoclave were poured 13.65 g (60.4 mmol) of the following fluorine-containing epoxy compound having a fluorine-containing alkyl group and represented by:

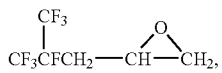

262 mg (3 mmol) of LiBr and 20 ml of NMP, and the inside of the autoclave was evacuated with stirring. Then $CO_2$ equivalent to 1.2 MPa was introduced to the inside of a system at room temperature, and the temperature inside the system was elevated to 100° C. to start a reaction. As the reaction proceeded, the inside pressure was lowered, and therefore $CO_2$ was further introduced until the pressure inside the system became stable at 1.2 MPa. When the pressure inside the system became stable, the inside of the system was brought to room temperature and the reaction was terminated. The obtained reaction solution was added to 1N aqueous solution of HCl, and the obtained lower layer was distilled under reduced pressure (0.3 mmHg) to obtain a cyclic carbonate having a fluorine-containing alkyl group as a distillate at 130° C. (yield: 85%).

As a result of an analysis of this product by $^{19}$F-NMR and $^{1}$H-NMR, it was confirmed that the product was a fluorine-containing cyclic carbonate of:

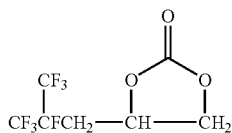

having a fluorine-containing alkyl group in its side chain.

$^{19}$F-NMR: (neat): −78.80 to −77.93 ppm (6F), −187.80 to −187.50 ppm (1F)

$^{1}$H-NMR: (neat): 2.89 ppm (2H), 4.32 to 4.38 ppm (1H), 4.76 to 4.82 ppm (1H), 5.22 to 5.32 ppm (1H)

In addition, a stretching vibration of a carbonyl group was confirmed at 1,797 cm$^{-1}$ by measuring with IR.

The fluorine content of this fluorine-containing cyclic carbonate was 49.3% by mass.

Comparative Preparation Example 1

Into a 300 ml flask equipped with a distillation column were poured 54 g (570 mmol) of 3-fluoromethyl-1,2-propyleneglycol, 160 g (1.356 mmol) of diethylene carbonate and 4 g (28.9 mmol) of potassium carbonate, followed by heating to 100° C., and then while distilling methanol generated from the distillation column, a reaction was carried out for 1.5 hours. After washing the reaction solution with water and separating, distillation was conducted under reduced pressure (10 mmHg) to obtain a cyclic carbonate as a distillate at 65° C. (yield: 28%).

As a result of an analysis of this product by $^{19}$F-NMR and $^{1}$H-NMR, it was confirmed that the product was a cyclic carbonate having a fluorine-containing alkyl group having one carbon atom and represented by:

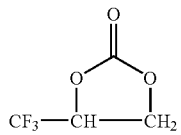

in which $CF_3$ is bonded directly to the cyclic carbonate.

$^{19}$F-NMR: (neat): −79.1 to −83.2 ppm (3F)

$^{1}$H-NMR: (neat): 4.44 to 4.61 ppm (2H), 4.91 ppm (1H)

In addition, a stretching vibration of a carbonyl group was confirmed at 1,801 cm$^{-1}$ by measuring with IR.

The fluorine content of this fluorine-containing cyclic carbonate was 36.5% by mass.

Comparative Preparation Example 2

Preparation of EC/DEC

Ethylene carbonate and diethylene carbonate were mixed in a weight ratio of 1:1 to obtain a homogeneous solution mixture.

Examples 1 to 7 and Comparative Examples 1 and 2

A flash point, a viscosity and compatibility with a hydrocarbon solvent were determined with respect to the cyclic carbonates having a fluorine-containing ether group obtained in Preparation Examples 1 to 3, the cyclic carbonates having a fluorine-containing alkyl group obtained in Preparation Examples 4 to 6, a mixture of the cyclic carbonate having a fluorine-containing alkyl group obtained in Preparation Example 4 and $CF_3CF_2CH_2$—O—(C═O)—O—$CH_2CF_2CF_3$ in a mass ratio of 1:1, the cyclic carbonate having a fluorine-containing alkyl group obtained in Comparative Preparation Example 1 and the mixture of non-fluorine-containing carbonates obtained in Comparative Preparation Example 2. Further $LiN(SO_2C_2F_5)_2$ was mixed as an electrolyte salt to the above-mentioned solutions in a concentration of 1 mole per liter to prepare electrolytic solutions. With respect to these electrolytic solutions, a withstand voltage and solubility of the electrolyte salt were determined. The results are shown in Table 1.

Since the fluorine-containing cyclic carbonates obtained in Preparation Examples 4 and 5 are solids at normal temperature, measurement of a withstand voltage and evaluation of solubility of the electrolyte salt were conducted at 60° C.

Flash Point:

A flash point of the solution is measured according to JIS K2265 (tag closed type)

Withstand Voltage:

The electrolytic solution is put in a 3-electrode type voltage measuring cell (working electrode, counter electrode: platinum (area ratio of counter electrode to working electrode is 5:1), reference electrode: Ag, HS cell available from Hosen Kabushiki Kaisha). Sweeping of electric potential is carried out at 3 mV/sec with a potentiostat, and a range where a decomposition current of not less than 0.1 mA is not flowed is assumed to be a withstand voltage (V).

Viscosity:

A viscosity of the solution is measured under the number of revolutions of 60 rpm at a temperature of 25° C., 0° C. and −20° C. with a Brookfield viscometer (VISCONE CV series available from Misec Corporation) by using a cone having a viscosity measuring range from 1 to 500 mPa·s.

Solubility of Electrolyte Salt:

To the solution is added $LiN(SO_2C_2F_5)_2$ and tetraethyl ammonium tetrafluoroborate $[(C_2H_5)_4NBF_4]$ at room temperature so that each concentration is 1 mole per liter, followed by stirring sufficiently, and solubility is observed with naked eyes.

◯: Dissolved homogeneously.

Δ: Slightly suspended.

X: Insoluble matter precipitated.

Compatibility with Hydrocarbon Solvent:

A hydrocarbon solvent is added to the solution at room temperature until its concentration becomes 50% by volume, followed by sufficiently stirring, and solubility is observed with naked eyes. The hydrocarbon solvents used are propylene carbonate (PC) and diethylene carbonate (DEC).

◯: Dissolved homogeneously.

X: Separated into two phases.

TABLE 1

|  | Ex. 1 | Ex. 2 | Ex. 3 | Ex. 4 | Ex. 5 |
| --- | --- | --- | --- | --- | --- |
| Carbonate | Prep. Ex. 1 | Prep. Ex. 2 | Prep. Ex. 3 | Prep. Ex. 4 | Prep. Ex. 5 |
| Flash point (° C.) | >80 | >80 | >80 | >80 | >80 |
| Withstand voltage (V) | 8.4 | 8.8 | 8.9 | >10 | >10 |
| Viscosity (25° C.: mPa · sec) | 3.5 | 3.2 | 3.2 | Solid | Solid |
| Viscosity (0° C.: mPa · sec) | 6.2 | 5.2 | 6.7 | Solid | Solid |
| Viscosity (−20° C.: mPa · sec) | 8.2 | 10.2 | 8.7 | Solid | Solid |
| Solubility of electrolyte salt | | | | | |
| $LiN(SO_2C_2F_5)_2$ | ◯ | ◯ | ◯ | ◯ | ◯ |
| $(C_2H_5)_4NBF_4$ | ◯ | ◯ | ◯ | ◯ | ◯ |
| Compatibility with hydrocarbon solvent | | | | | |
| PC | ◯ | ◯ | ◯ | ◯ | ◯ |
| DEC | ◯ | ◯ | ◯ | ◯ | ◯ |

|  | Ex. 6 | Ex. 7 | Com. Ex. 1 | Com. Ex. 2 |
| --- | --- | --- | --- | --- |
| Carbonate | Prep. Ex. 6 | Mixture (Note) | Com. Prep. Ex. 1 | Com. Prep. Ex. 2 |
| Flash point (° C.) | >80 | >80 | 29 | 24 |
| Withstand voltage (V) | >10 | >10 | >10 | 5.6 |
| Viscosity (25° C.: mPa · sec) | 3.2 | 3.2 | 3.4 | 0.6 |
| Viscosity (0° C.: mPa · sec) | 4.5 | 4.2 | Solidified | 8.2 |
| Viscosity (−20° C.: mPa · sec) | 8.1 | 6.5 | Solidified | Solidified |
| Solubility of electrolyte salt | | | | |
| $LiN(SO_2C_2F_5)_2$ | ◯ | ◯ | ◯ | ◯ |
| $(C_2H_5)_4NBF_4$ | ◯ | ◯ | Δ | ◯ |
| Compatibility with hydrocarbon solvent | | | | |
| PC | ◯ | ◯ | ◯ | ◯ |
| DEC | ◯ | ◯ | ◯ | ◯ |

(Note)
A mixture of the cyclic carbonate of Preparation Example 4 and $CF_3CF_2CH_2$—O—(C=O)—O—$CH_2CF_2CF_3$ in a weight ratio of 1:1.

Examples 8 and 9 and Comparative Example 3

Into a 3 ml sampling bottle was poured 1 g of the solvent mixture of ethylene carbonate (EC) and diethylene carbonate (DEC) prepared in Comparative Preparation Example 2, and thereto was added 0.5 g of a fluorine-containing ether $(CF_3CF_2CH_2OCF_2CF_2H)$, followed by sufficiently stirring. The solution was separated into two layers.

To this solution separated into two layers was added 1.2 g each of the fluorine-containing cyclic carbonates synthesized in Preparation Example 2, Preparation Example 3 and Comparative Preparation Example 1, followed by sufficiently stirring and then allowing to stand. Thereafter a state of the solution mixture was observed with naked eyes. The result of evaluation is indicated by ◯: when the solution is homogeneous, Δ: when the solution is in a suspended state, and x: when precipitation (separation) occurs. As a result, in both of Example 8 (the cyclic carbonate having a fluorine-containing ether group of Preparation Example 2) and Example 9 (the cyclic carbonate having a fluorine-containing ether group of Preparation Example 3), compatibility was ◯, but in Comparative Example 3 (the cyclic carbonate having a fluorine-containing alkyl group of Comparative Preparation Example 1), compatibility was x.

Example 10

In 0.3 g each of the respective electrolytic solutions prepared in Examples 1 to 7 and Comparative Example 2 was completely dissolved 1 g of polyvinylidene fluoride containing 6.9% by mole of hexafluoropropene and having a number average molecular weight of 150,000 at 120° C., and the solutions were cast on a metallic substrate. Then after sufficiently cooling at room temperature, the formed solid electrolyte films were peeled off from the metallic substrate to obtain gel electrolyte films (1.3 g). These gel electrolyte films were all solid self-keeping films.

These gel electrolyte films were held with a metallic mesh and subjected to combustion test by using a flame of a gas burner. As a result, the gel electrolyte film prepared by using the electrolytic solution prepared in Comparative Example 2 burnt, but the gel electrolyte films prepared by using the electrolytic solutions prepared in Examples 1 to 7 did not burn.

Example 11

Ethanol was added to a mixture of a phenol resin active carbon activated with steam and having a specific surface area of 2,000 $m^2/g$, polytetrafluoroethylene (PTFE) and carbon black in a mass ratio of 8:1:1, followed by kneading. The resulting kneaded product was molded into a sheet and rolled into a 0.6 mm thick sheet. The obtained sheet was punched into a disc having a diameter of 12 mm to prepare an electrode.

This disk-like electrode was adhered to the inside of a positive electrode side and a negative electrode side of a stainless steel case by using a graphite adhesive, in which the stainless steel case served as a current collector and a housing member of a coin cell. Then this stainless steel case was subjected to heat treatment at 200° C. under reduced pressure to remove water, and the disk-like electrode was impregnated with an electrolytic solution prepared by dissolving the following three kinds of electrolyte salts 1 to 3 in the compound synthesized in Preparation Example 1 so that each concentration became 1M. Then a separator (thickness: 160 μm, percentage of void: 70%) made of a non-woven fabric of polypropylene fiber was put between the both electrodes and the stainless steel case was sealed by caulking with a gasket which was an insulator. Thus a 2.0 mm thick coin type electrolytic double layer capacitor having a diameter of 18.4 mm was produced.

After applying dc voltage (2.5 V, 3.5 V and 5.0 V) to this capacitor for 48 hours, charging and discharging were carried out 2,000 times at a current density of 0.3 mA/cm². A capacity before and after the charging and discharging was measured, and a rate of decrease in capacity after the charging and discharging to the initial capacity was determined. The results are shown in Table 2.

(Electrolyte Salts Used)

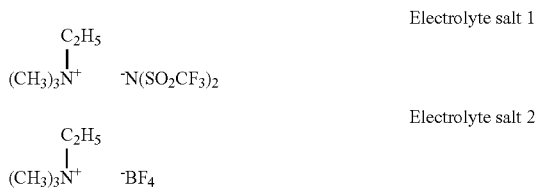

Electrolyte salt 1

Electrolyte salt 2 synthesized in Preparation Example 2 was used instead of the cyclic carbonate synthesized in Preparation Example 1. The results are shown in Table 2.

Example 13

A rate of change in capacity was determined in the same manner as in Example 11 except that the cyclic carbonate synthesized in Preparation Example 6 was used instead of the cyclic carbonate synthesized in Preparation Example 1. The results are shown in Table 2.

Example 14

A rate of change in capacity was determined in the same manner as in Example 11 except that a mixture of the cyclic carbonate synthesized in Preparation Example 4 and $CF_3CF_2CH_2$—O—(C=O)—O—$CH_2CF_2CF_3$ in a mass ratio of 1:1 was used instead of the cyclic carbonate synthesized in Preparation Example 1. The results are shown in Table 2.

Comparative Example 4

A rate of change in capacity was determined in the same manner as in Example 11 except that the mixture of non-fluorine-containing carbonates synthesized in Comparative Preparation Example 2 was used instead of the cyclic carbonate synthesized in Preparation Example 1. The results are shown in Table 2.

TABLE 2

| | | Ex. 11 | | Ex. 12 | | Ex. 13 | | Ex. 14 | | Com. Ex. 4 | |
|---|---|---|---|---|---|---|---|---|---|---|---|
| Electrolyte salt | Applied Voltage (V) | Carbonate | Rate of change in capacity (%) | Carbonate | Rate of change in capacity (%) | Carbonate | Rate of change in capacity (%) | Carbonate | Rate of change in capacity (%) | Carbonate | Rate of change in capacity (%) |
| 1 | 2.5 | Prep. Ex. 1 | 3 | Prep. Ex. 2 | 2 | Prep. Ex. 6 | 2 | Mixture (Note 1) | 3 | Com. Prep. Ex. 2 | 3 |
| | 3.5 | | 12 | | 15 | | 10 | | 11 | | 47 |
| | 5.0 | | 42 | | 45 | | 51 | | 48 | | - (Note 2) |
| 2 | 2.5 | Prep. Ex. 1 | 2 | Prep. Ex. 2 | 3 | Prep. Ex. 6 | 2 | Mixture (Note 1) | 3 | Com. Prep. Ex. 2 | 3 |
| | 3.5 | | 4 | | 3 | | 2 | | 2 | | 52 |
| | 5.0 | | 10 | | 9 | | 8 | | 10 | | - (Note 2) |
| 3 | 2.5 | Prep. Ex. 1 | 3 | Prep. Ex. 2 | 3 | Prep. Ex. 6 | 2 | Mixture (Note 1) | 2 | Com. Prep. Ex. 2 | 3 |
| | 3.5 | | 2 | | 3 | | 4 | | 3 | | 59 |
| | 5.0 | | 4 | | 3 | | 3 | | 3 | | - (Note 2) |

(Note 1)
A mixture of the cyclic carbonate synthesized in Preparation Example 4 and $CF_3CF_2CH_2$—O—(C=O)—O—$CH_2CF_2CF_3$ in a mass ratio of 1:1
(Note 2)
Un-measurable due to blistering -continued

Electrolyte salt 3

Example 12

A rate of change in capacity was determined in the same manner as in Example 11 except that the cyclic carbonate In any of Examples 11 to 14, initial capacities were all within a range from 120 F/g to 150 F/g.

Example 15

A rate of change in capacity was determined in the same manner as in Example 11 except that the cyclic carbonate synthesized in Preparation Example 6 was used instead of the cyclic carbonate synthesized in Preparation Example 1 and the electrolytic solution was prepared by adding DEMA.BF$_4$ as an electrolyte salt in an amount of 1 mole per liter. After applying dc voltage (3.5 V) for 48 hours, charging and discharging were carried out 2,000 times at a current density of 0.3 mA/cm².

The initial capacity was 155 F/g, and the capacity after charging and discharging 2,000 times was 143 F/g. The rate of decrease in capacity was 7.7%.

Example 16

A rate of change in capacity was determined in the same manner as in Example 15 except that the electrolytic solution was prepared in the same manner as in Example 11 except that the cyclic carbonate synthesized in Preparation Example 6 was used instead of the cyclic carbonate synthesized in Preparation Example 1 and spiro-(1,1')bipyrrolidinium.BF$_4$ was added as an electrolyte salt in an amount of 1 mole per liter.

The initial capacity was 160 F/g, and the capacity after charging and discharging 2,000 times was 148 F/g. The rate of decrease in capacity was 7.5%.

Example 17

A coin type lithium secondary battery was produced by the following method.

(Preparation of Positive Electrode)

Carbon black (6% by mass) and polyvinylidene fluoride (brand name KF-1000 available from Kureha Kagaku Kabushiki Kaisha) (9% by mass) were added and mixed to LiCoO$_2$ (85% by mass) and the mixture was formed into a slurry by dispersing with N-methyl-2-pyrrolidone. The obtained mixture in the form of slurry was used as an active material for a positive electrode and coated uniformly on a 20 μm thick aluminum foil which was a current collector for a positive electrode. After drying, the coated aluminum foil was punched into a disc form having a diameter of 12.5 mm to make a positive electrode.

(Preparation of Negative Electrode)

A styrene-butadiene rubber (SBR) dispersed in distilled water was added to 94% by weight of artificial graphite powder (brand name KS-44 available from TIMCAL) to be a solid content of 6% by weight, and then was mixed with a disperser to be formed into a slurry. The mixture was uniformly coated on a 18 μm thick copper foil which was a current collector for a negative electrode. After drying, the coated copper foil was punched into a disc form having a diameter of 12.5 mm to make a negative electrode.

(Preparation of Coin Type Lithium Secondary Battery)

The above-mentioned positive electrode was put in a stainless steel can which doubled as a current collector for a positive electrode, and then the above-mentioned negative electrode was put thereon with a polyethylene separator impregnated with the electrolytic solutions raised below being placed between them. This can and a sealing sheet which doubled as a current collector for a negative electrode were sealed by caulking with an insulating gasket being placed between them to make a coin type lithium secondary battery.

After applying dc voltage (3.5 V) to this secondary battery for 48 hours, charging and discharging were carried out at a current density of 0.3 mA/cm². Charging and discharging 100 times is assumed to be one cycle, and a rate of decrease in capacity to an initial capacity was determined.

(1) Electrolytic solution comprising LiPF$_6$ (1M); EC/DEC and the fluorine-containing cyclic carbonate of Preparation Example 1 (1/1/0.2% by weight ratio).

A rate of decrease in capacity after 100 cycles was 7%.

(2) Electrolytic solution comprising LiPF$_6$ (1M); EC/DEC and the fluorine-containing cyclic carbonate of Preparation Example 1 (1/1/0.1% by weight ratio).

A rate of decrease in capacity after 100 cycles was 5%.

(3) Electrolytic solution comprising LiPF$_6$ (1M); EC/DEC and the fluorine-containing cyclic carbonate of Preparation Example 2 (1/1/0.2% by weight ratio).

A rate of decrease in capacity after 100 cycles was 10%.

(4) Electrolytic solution comprising LiPF$_6$ (1M); EC/DEC and the fluorine-containing cyclic carbonate of Preparation Example 2 (1/1/0.1% by weight ratio).

A rate of decrease in capacity after 100 cycles was 7%.

(5) Electrolytic solution comprising LiPF$_6$ (1M); EC/DEC and the fluorine-containing cyclic carbonate of Preparation Example 6 (1/1/0.1% by weight ratio).

A rate of decrease in capacity after 100 cycles was 8%.

(6) Electrolytic solution comprising LiPF$_6$ (1M); EC/DEC and the fluorine-containing cyclic carbonate of Preparation Example 6 (1/1/0.1% by weight ratio).

A rate of decrease in capacity after 100 cycles was 4%.

(7) Electrolytic solution comprising LiPF$_6$ (1M); EC/DEC and the fluorine-containing cyclic carbonate of Preparation Example 6 (1/1/0.2% by weight ratio).

A rate of decrease in capacity after 100 cycles was 12%.

(8) Electrolytic solution comprising LiPF$_6$ (1M); EC/DEC and the fluorine-containing cyclic carbonate of Preparation Example 6 (1/1/0.2% by weight ratio).

A rate of decrease in capacity after 100 cycles was 9%.

INDUSTRIAL APPLICABILITY

According to the present invention, there can be provided the electrolytic solutions being capable of enhancing flame retardance, low temperature characteristics, withstand voltage, solubility of an electrolyte salt and compatibility with a hydrocarbon solvent in good balance.

The invention claimed is:

1. An electrolytic solution comprising a fluorine-containing cyclic carbonate (I) represented by the formula (I):

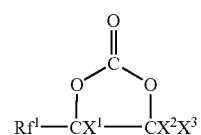

(I)

wherein Rf$^1$ is a fluorine-containing ether group (Ia), or a fluorine-containing alkoxyl group (Ib); X$^1$, X$^2$ and X$^3$ are H, and an electrolyte salt (II).

2. The electrolytic solution of claim 1, wherein in said cyclic carbonate (I), Rf$^1$ is a fluorine-containing ether group represented by the formula (Ia-1):

(Ia-1)

wherein R$^1$ is an alkyl group which may have fluorine atom; R$^2$ is an alkylene group which may have fluorine atom; n1 is an integer of 1 to 3; and at least either of R$^1$ or R$^2$ has fluorine atom.

3. The electrolytic solution of claim 1, wherein in said cyclic carbonate (I), a fluorine content of $Rf^1$ is 10 to 76% by mass.

4. The electrolytic solution of claim 1, having a viscosity at 0° C. of not more than 30 mPa·s.

5. The electrolytic solution of claim 1, having a viscosity at −20° C. of not more than 40 mPa·s.

6. An electrochemical device provided with the electrolytic solution of claim 1.

7. An electric double layer capacitor provided with the electrolytic solution of claim 1 and having a withstand voltage of not less than 3.5 V.

* * * * *